United States Patent
Tsai

(10) Patent No.: US 9,185,339 B2
(45) Date of Patent: Nov. 10, 2015

(54) METHOD AND SYSTEM FOR INCREASING FRAME-DISPLAY RATE

(75) Inventor: Leonard Tsai, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1137 days.

(21) Appl. No.: 13/122,150

(22) PCT Filed: Oct. 24, 2008

(86) PCT No.: PCT/US2008/012132
§ 371 (c)(1),
(2), (4) Date: Mar. 31, 2011

(87) PCT Pub. No.: WO2010/047680
PCT Pub. Date: Apr. 29, 2010

(65) Prior Publication Data
US 2011/0194612 A1    Aug. 11, 2011

(51) Int. Cl.
*H04N 7/12* (2006.01)
*H04N 7/01* (2006.01)
(Continued)

(52) U.S. Cl.
CPC ............... *H04N 7/014* (2013.01); *H04N 19/44* (2014.11); *H04N 19/59* (2014.11); *G09G 2320/0247* (2013.01); *G09G 2320/0261* (2013.01); *G09G 2320/106* (2013.01); *G09G 2340/0435* (2013.01); *H04N 7/0127* (2013.01)

(58) Field of Classification Search
CPC ............ H04N 19/00757; H04N 7/014; H04N 19/00533; H04N 19/59; H04N 19/44; G09G 2320/0247; G09G 2320/0261

USPC ...................... 348/441; 375/240.16
See application file for complete search history.

(56) References Cited

U.S. PATENT DOCUMENTS 5,751,364 A * 5/1998 Yasuda et al. ............ 375/240.16
8,395,700 B2 * 3/2013 Ueno et al. .................... 348/441
(Continued)

FOREIGN PATENT DOCUMENTS

CN      101159838 A       4/2008
EP        1931141 A1      6/2008
JP       2007274679      10/2007

OTHER PUBLICATIONS

WIPO, International Search Report, dated Jun. 15, 2009, PCT/US2008/012132 filed Oct. 24, 2008.
(Continued)

*Primary Examiner* — Y Lee
*Assistant Examiner* — Richard Carter
(74) *Attorney, Agent, or Firm* — Hewlett-Packard Patent Department

(57) ABSTRACT

Embodiments of the present invention provide an efficient and cost-effective implementation of a method and system for increasing the frame-display rate of a video display device. Video data is often input to a video-display device in a compressed form that includes encoded and compressed motion vectors. The motion vectors provide information about portions of successive video frames which change in relative position. The motion vectors are decompressed and decoded along with the frames. In certain embodiments of the present invention, a first frame and an accompanying motion-vector table are transmitted from a processing component to a timing-controller component of a video-display device, using which the timing-controller component can generate a second frame that is displayed following display of the first frame.

14 Claims, 31 Drawing Sheets

(51) Int. Cl.
*H04N 19/44* (2014.01)
*H04N 19/59* (2014.01)

(56) References Cited

U.S. PATENT DOCUMENTS

| | | | |
|---|---|---|---|
| 8,477,848 B1 * | 7/2013 | Patankar et al. | 375/240.16 |
| 2005/0078212 A1 | 4/2005 | Ha | |
| 2005/0249288 A1 | 11/2005 | Ha | |
| 2007/0211801 A1 * | 9/2007 | Matsubayashi | 375/240.16 |
| 2007/0229703 A1 | 10/2007 | Lu | |
| 2007/0286502 A1 | 12/2007 | Uetani et al. | |
| 2008/0095239 A1 | 4/2008 | Lim et al. | |
| 2008/0129862 A1 * | 6/2008 | Hamada et al. | 348/441 |

OTHER PUBLICATIONS

Office Action, CN Application No. 200880131647.0, Date: Dec. 4, 2012, pp, 1-7.
Office Action, GB Application No. 1105948.2, Date: Apr. 10, 2013, pp. 1-2.

* cited by examiner

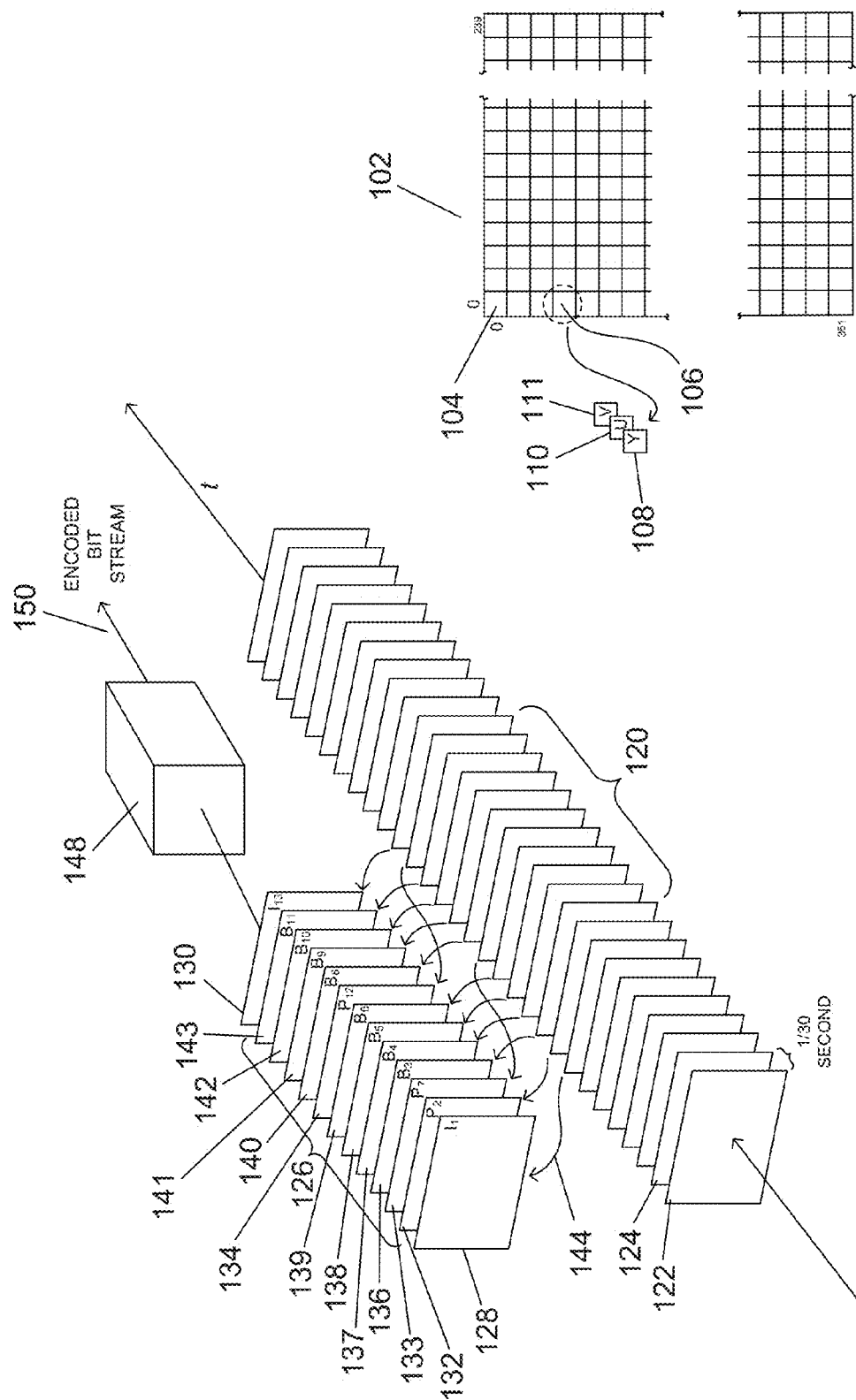

$$Q = \begin{bmatrix} 8 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 28 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{bmatrix}$$

$$QDCT = \frac{DCT_{(8x8)} * 8}{scale * Q}$$

Figure 7

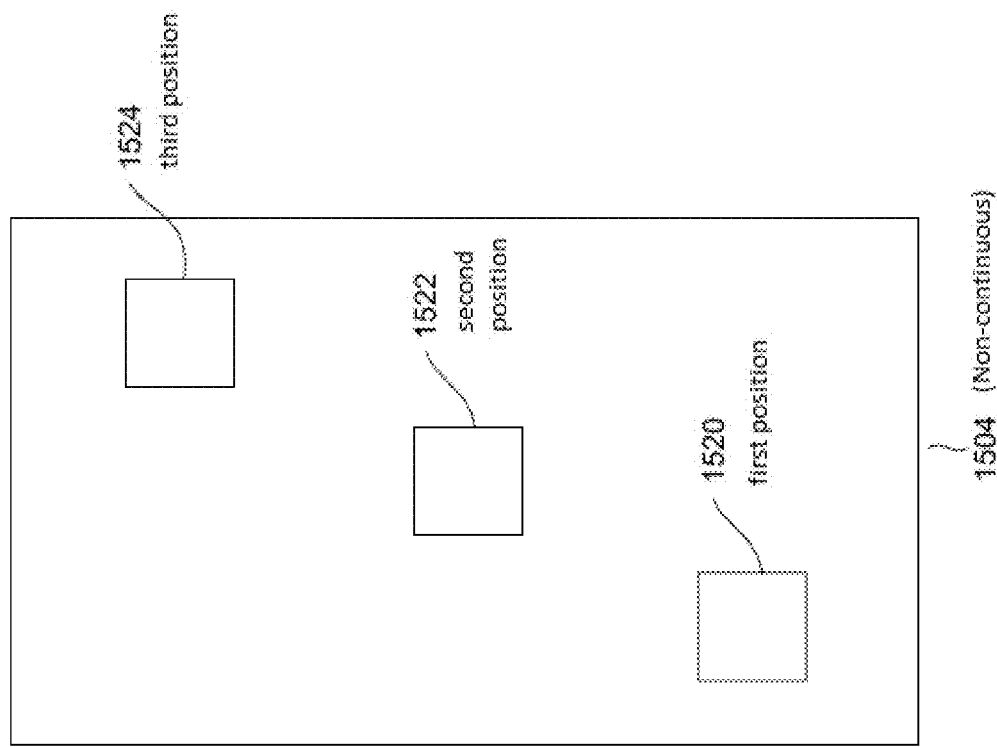
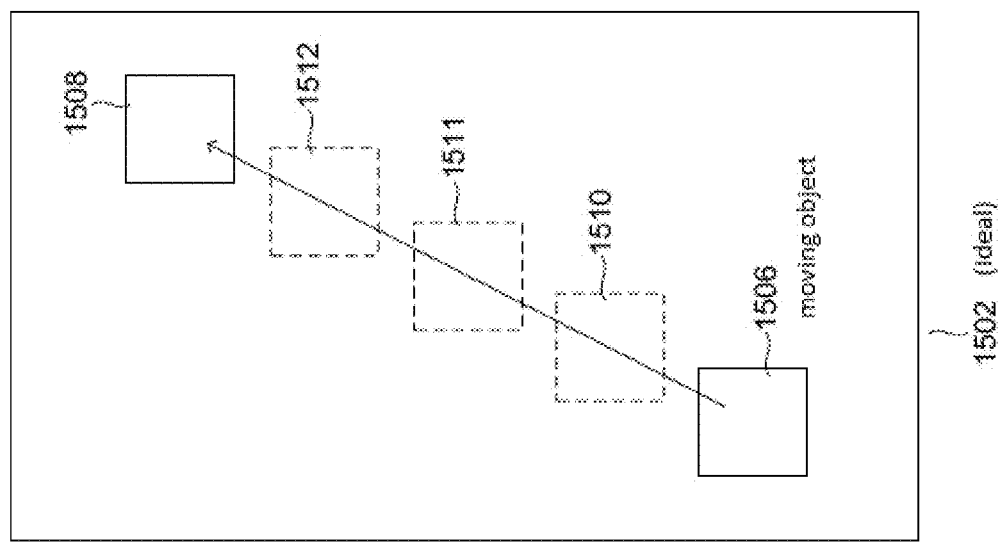
Figure 15

METHOD AND SYSTEM FOR INCREASING FRAME-DISPLAY RATE

TECHNICAL FIELD

The present invention is related to televisions, computer monitors, and other display devices and, in particular, to a method and system for increasing the frame-display rate of a display device using motion information extracted from an encoded and compressed input video stream.

BACKGROUND OF THE INVENTION

Motion pictures, broadcast television programs, and videos rendered on video-display devices provide to a viewer the illusion of continuous motion by rapidly displaying a sequence of still images. The still images are referred to as "frames." When a sufficient number of frames are displayed per second, the human visual system fills in the time gaps between successive frames to create the illusion of continuous motion. Motion pictures display 24 frames per second, with a ⅟₃₀ second interval between frames, analog television displays 30 frames per second, or, equivalents, 60 interleaving fields per second, and future high-definition television ("HDTV") standards are expected to specify a frame-display rate of 60 frames per second.

While, in general, the illusion of continuous motion generated by display of a sequence of still frames allows humans to watch and enjoy motion pictures and television broadcasts, the illusion of continuous motion provided by motion pictures and television broadcasts is not perfect. Certain artifacts and annoyances arise from the discontinuous nature of motion pictures, television, and video display, collectively referred to as "video display" in this document. One exemplary artifact is that, in television broadcast of old western movies, the wheels on covered wagons and carriages occasionally appear to move backwards when the carriages and covered wagons are moving forward and the rotation of the wheels, in revolutions per second, is slightly slower than the frame capture rate of the motion-picture camera. An example of an annoyance that arises from the discrete nature of video display is the perceptible flicker of cathode-ray-tube-based television displays and computer monitors.

As video-display devices have improved, over the years, and evolved from analog devices to digital devices, video-display devices have become capable of providing higher display rates, including display rates that are higher than the frame-capture rates at which video frame are recorded and transmitted through various broadcast and electronic or optical data-transmission media. Increased display rates generally provide a better illusion of continuous motion with fewer artifacts and annoyances. However, implementations of video-display devices capable of these higher frame-display rates may be substantially more complex and expensive. For this reason, designers and manufacturers of various types of video-display devices strive to increase frame display rates while minimizing increases in hardware complexity and implementation cost.

SUMMARY OF THE INVENTION

Embodiments of the present invention provide an efficient and cost-effective implementation of a method and system for increasing the frame-display rate of a video display device. Video data is often input to a video-display device in a compressed form that includes encoded and compressed motion vectors. The motion vectors provide information about portions of successive video frames which change in relative position. The motion vectors are decompressed and decoded along with the frames. In certain embodiments of the present invention, a first frame and an accompanying motion-vector table are transmitted from a processing component to a timing-controller component of a video-display device, using which the timing-controller component can generate a second frame that is displayed following display of the first frame. In this fashion, display of the generated frames is interleaved between display of decompressed and decoded frames, resulting in an increased frame-display rate relative to the rate at which frames are received by decompressing and decoding an input video signal.

BRIEF DESCRIPTION OF THE DRAWINGS

FIG. 1 illustrates a pixel-based video-signal frame.
FIG. 2 illustrates encoding of a frame-based video signal.
FIG. 7 illustrates an exemplary quantization of frequency-domain coefficients.
FIG. 15 illustrates this blurring of moving objects by sample-and-hold display devices.

DETAILED DESCRIPTION OF THE INVENTION

Figure 3:
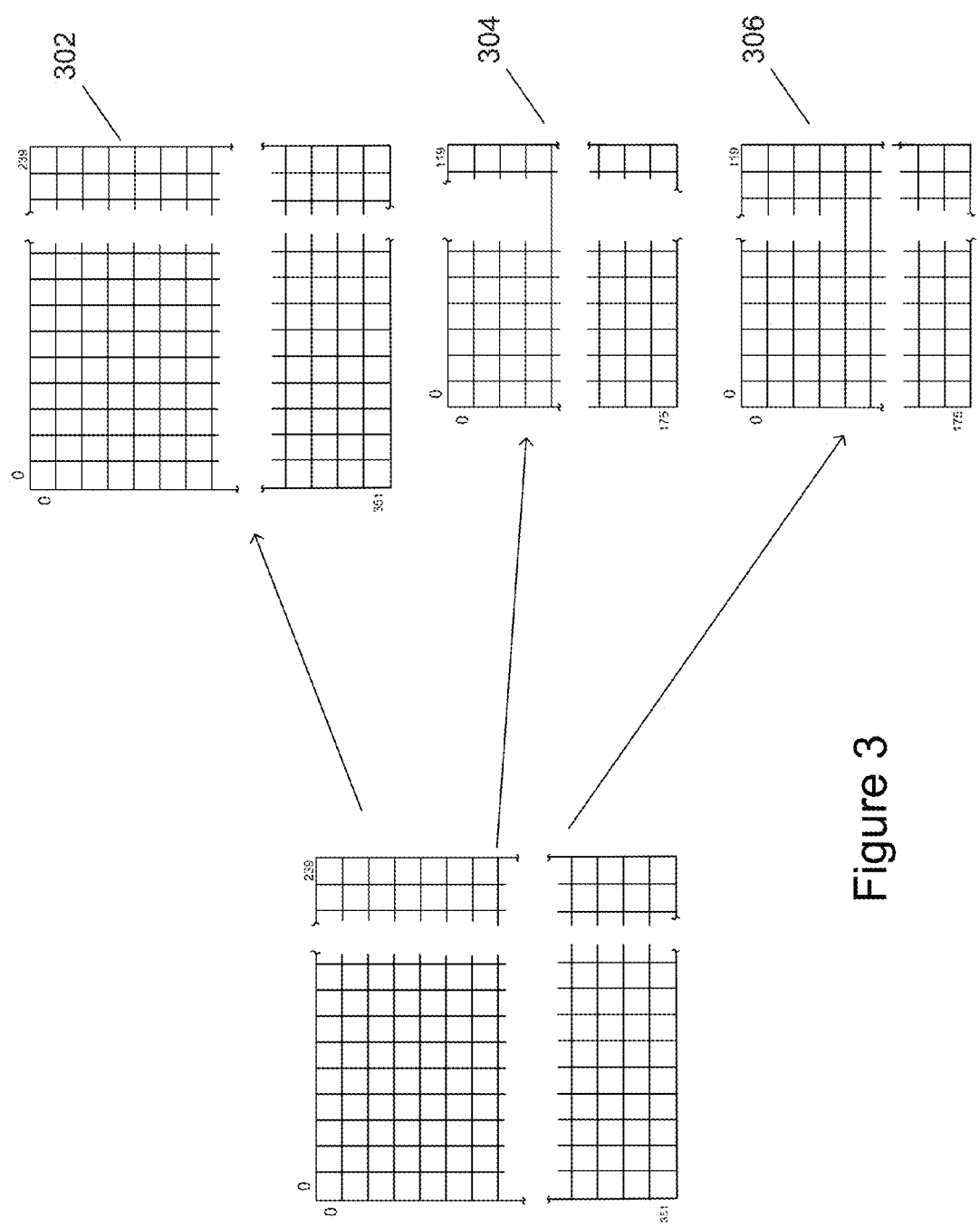
FIG. 3 illustrates a first, logical step in encoding of a frame.

Embodiments of the present invention are directed to methods and hardware systems for increasing the frame display rate of video-display devices in efficient and cost-effective manners. In particular, embodiments of the present invention increase the frame display rate of a video-display device by generating a second set of frames that are inserted between the frames extracted from an input video stream in order to increase the number of frames available for display during each interval of time by the video-display device. For example, in an HDTV that receives 30 frames per second for display and doubles the available frames to 60 frames per second by a deinterleaving process, the number of frames available for display in the input video stream is, in one embodiment of the present invention, again doubled to 160 frames per second, with each frame of the resulting output video stream displayed for $\frac{1}{120}$ of a second to produce a frame display rate of 120 Hz.

In a first subsection, below, encoding, compression, decompression, and decoding of video data is described in overview. In a second subsection, a currently available video-display device is described, including a proposed implementation for doubling the frame-display rate of the currently available video-display device. In a final subsection, below, embodiments of the present invention are discussed.

Encoding, Compression, Decompression, and Decoding of Video Data

FIG. 1 illustrates a pixel-based video-signal frame. The frame 102 can be considered to be a two-dimensional array of pixel values. Each cell of the two-dimensional array, such as cell 104, represents a pixel value for display by a corresponding pixel of an electronic display device, such as a television display or computer monitor. There are various standards for video-signal frames, including a standard that specifies that each frame contains 240×352 pixels for display on a computer monitor and a standard that specifies that each frame contains 1920×1080 pixels for display on a flat panel HDTV. The digital representation of each pixel, such as pixel value 106, includes a luminance value 108 and two chrominance values 110-111. The luminance value 108 can be thought of as controlling the grayscale darkness or brightness of the pixel, and the chrominance values 110 and 111 specify the color to be displayed by the pixel.

FIG. 2 illustrates encoding of a frame-based video signal. A raw video signal can be considered to be a series, or sequence, of frames 120 ordered with respect to time. In one common standard, any two consecutive frames, such as frames 122 and 124 in FIG. 2, are separated by a time difference of $\frac{1}{30}$ of a second. The video encoding process divides the sequence of frames in the raw signal into a time-ordered sequence of subsequences, each subsequence referred to as a "GOP." Each GOP may overlap the previous and succeeding GOPS in the first and last frames. In FIG. 2, the 13 frames 126 comprise a single GOP. The number of frames in a GOP may vary, depending on the particular codec implementation, desired fidelity of reconstruction of the video signal, desired resolution, and other factors. A GOP generally begins and ends with intraframes, such as intraframes 128 and 130 in GOP 126. Intraframes, also referred to as "1 frames," are reference frames that are spatially encoded. A number of P frames 132-134 and B frames 136-139 and 140-143 may occur within the GOP. P frames and B frames may be both spatially and temporally encoded. Encoding of a P frame relies on a previous I frame or P frame, while the encoding of a B frame relies on both a previous and subsequent I frame or P frame. In general, I frames and P frames are considered to be reference frames. As shown in FIG. 2 by arrows, such as arrow 144, the frames selected for P frames and B frames may occur in a different order within the GOP than the order in which they occur in an input video signal. Each GOP is input, in time order, to an encoding module 148 which encodes the information contained within the GOP into a compressed bit stream 150 that can be output for storage on an electronic storage medium or for transmission via an electronic communications medium.

FIG. 3 illustrates a first, logical step in encoding of a frame. As discussed with reference to FIG. 1, above, a video frame 102 can be considered to be a two-dimensional array of pixel values, each pixel value comprising a luminance value and two chrominance values. Thus, a single video frame can be alternatively considered to be composed of a luminance frame 302 and two chrominance frames 304 and 306. Because human visual perception is more acutely attuned to luminance than to chrominance, the two chrominance, frames 304 and 306 are generally decimated by a factor of two in each dimension, or by an overall factor of four, to produce lower-resolution frames. For example, a 240×352 video frame may be decimated to produce a lower-resolution 120×175 frame.

Figure 4:
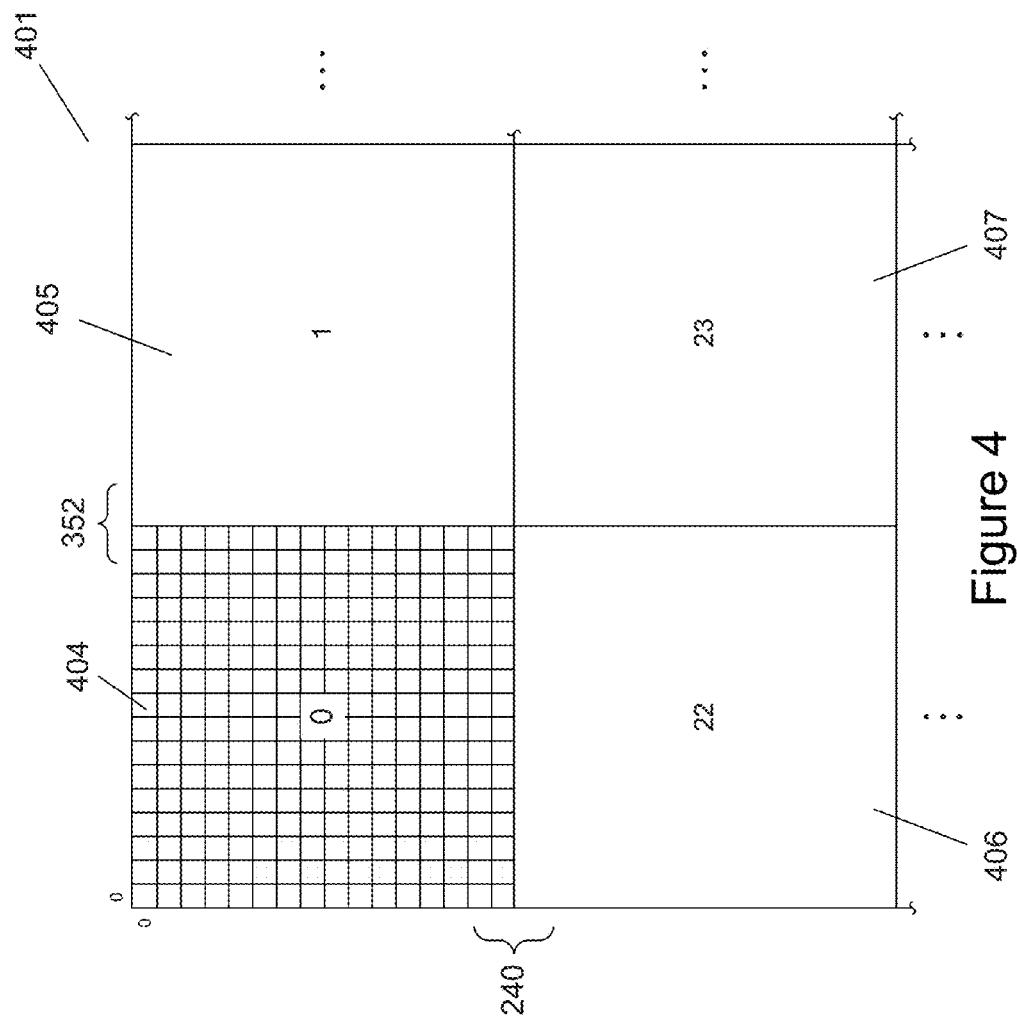
FIG. 4 illustrates composition of a video frame into macroblocks.

FIG. 4 illustrates composition of a video frame into macroblocks. As shown in FIG. 4, a video frame, such as the 240×352 video frame 401, only a small portion of which appears in FIG. 4, can be decomposed into a set of non-overlapping 16×16 macroblocks. This small portion of the frame shown in FIG. 4 has been divided into four macroblocks 404-407. When the macroblocks are numerically labeled, by left-to-right order of appearance in successive rows of the video frame, the first macroblock 401 in FIG. 4 is labeled "0" and the second macroblock 405 is labeled "1." Twenty additional macroblocks, not shown in FIG. 4, follow macroblock 1 in the first row of the video frame, so the third macroblock 406 shown in FIG. 4, the first macroblock of the second row, is labeled "22," and the final macroblock 407 shown in FIG. 4 is labeled "23."

Figure 5:
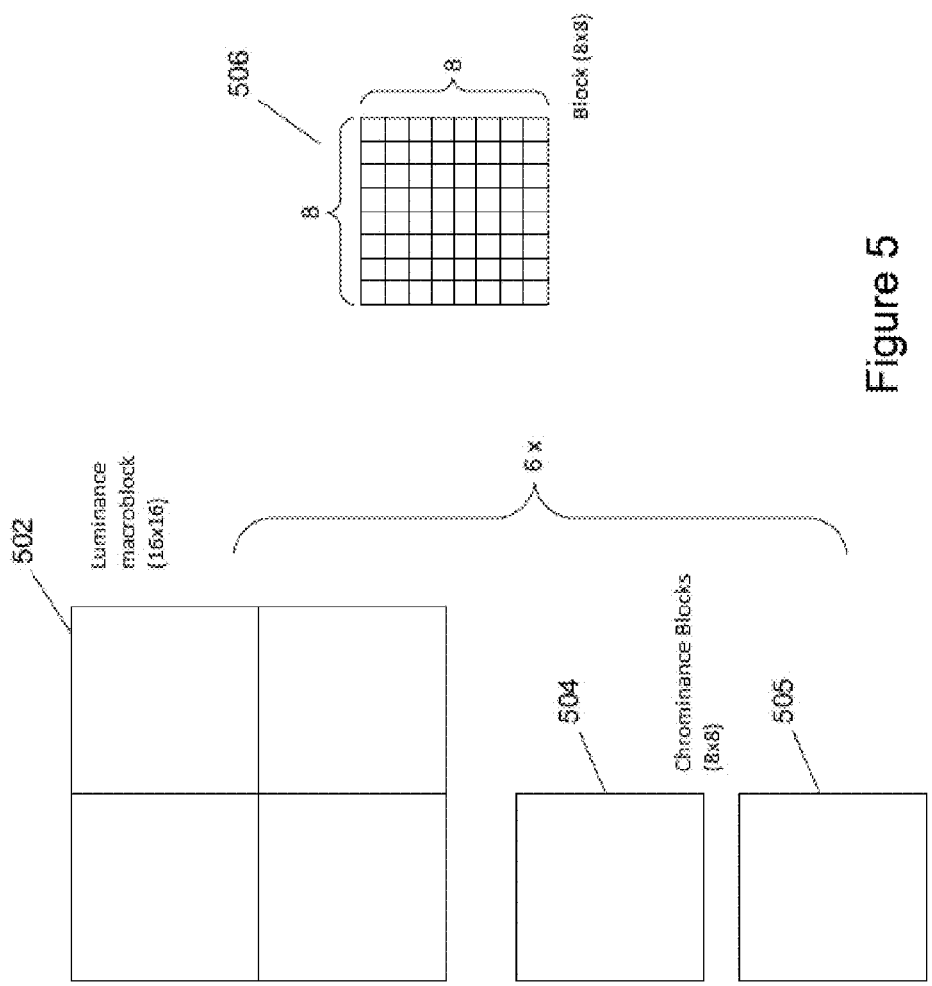
FIG. 5 illustrates decomposition of a macroblock into six 8×8 blocks.

FIG. 5 illustrates decomposition of a macroblock into six 8×8 blocks. As discussed above, a video frame, such as video frame 102 in FIG. 1, can be decomposed into a series of 16×16 macroblocks, such as macroblock 404 in FIG. 4. As discussed with reference to FIG. 3, each video frame, or macroblock within a video frame, can be considered to be composed of a luminance frame and two chrominance frames, or a luminance macroblock and two chrominance macroblocks, respectively. As discussed with reference to FIG. 3, chrominance frames and/or macroblocks are generally decimated by an overall factor of four. Thus, a given macroblock within a video frame, such as macroblock 404 in FIG. 4, can be considered to be composed of a luminance 16×16 macroblock 502 and two 8×8 chrominance blocks 504 and 505. The luminance macroblock 502 can be, as shown in FIG. 5, decomposed, into four 8×8 blocks. Thus, a given macroblock within a video frame, such as macroblock 404 in video frame 401 shown in FIG. 4, can be decomposed into six 8×8 blocks 506, including four luminance 8×8 blocks and two chrominance 8×8 blocks. Spatial encoding of video frames is carried out on an 8×8 block basis. Temporal encoding of video frames is carried out on a 16×16 macroblock basis.

Figure 6:
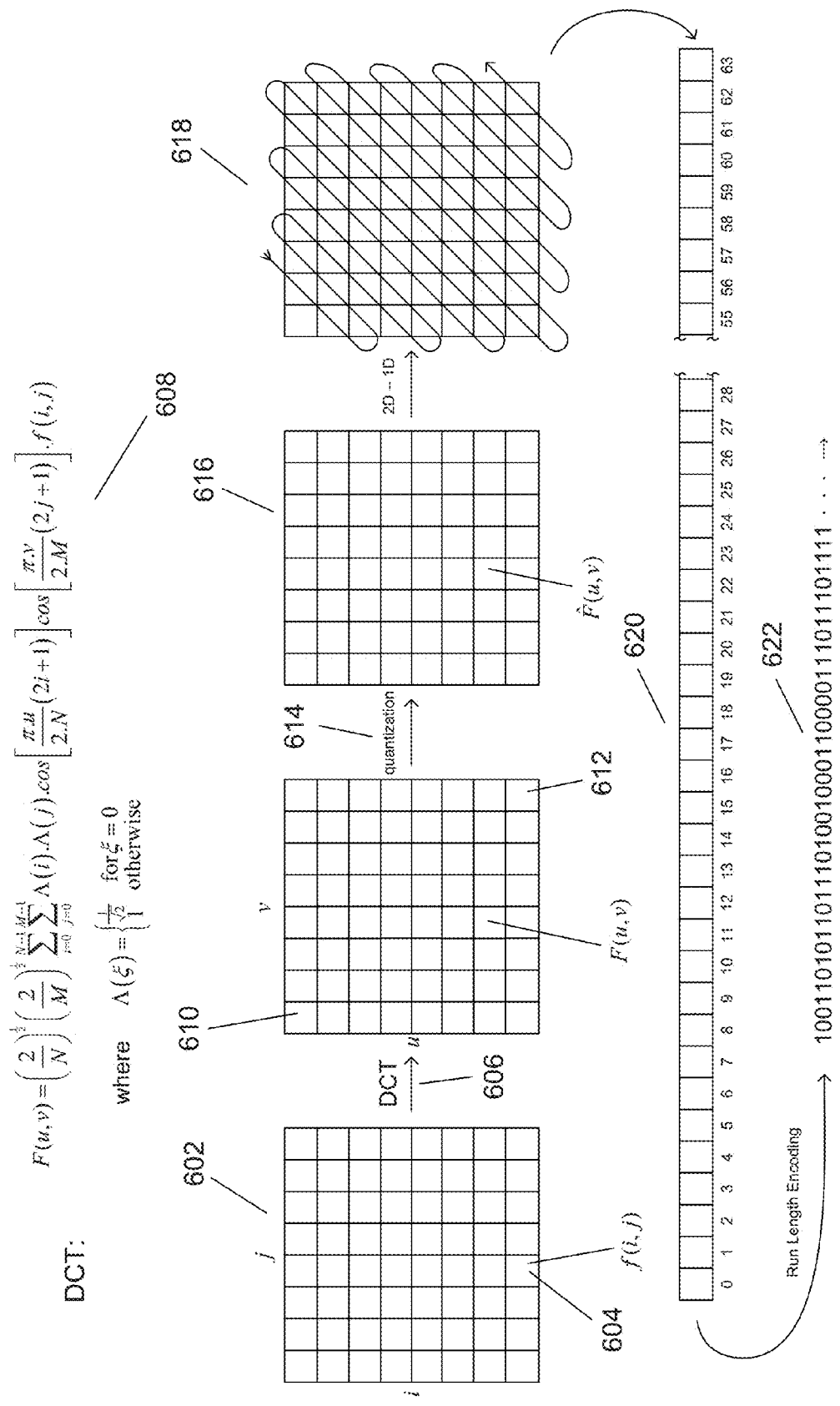
FIG. 6 illustrates spatial encoding of an 8×8 block extracted from a video frame.

FIG. 6 illustrates spatial encoding of an 8×8 block extracted from a video frame, as discussed above with reference to FIGS. 1-5. Each cell or element of the 8×8 block 602, such as cell 604, contains a luminance or chrominance value $f(i,j)$, where i and j are the row and column coordinates, respectively, of the cell. The cell is transformed 606, in many cases using a discrete cosign transform ("DCT"), from the spatial domain represented by the array of intensity values $f(i,j)$ to the frequency domain, represented by a two-dimensional 8×8 array of frequency-domain coefficients $F(u,v)$. An expression for an exemplary DCT is shown at the top of FIG. 6 608. The coefficients in the frequency domain indicate spatial periodicities in the vertical, horizontal, and both vertical and horizontal directions within the spatial domain. The $F_{(0,0)}$ coefficient 610 is referred to as the "DC" coefficient, and has a value proportional to the average intensity within the 8×8 spatial-domain block 602. The periodicities represented by the frequency-domain coefficients increase in frequency from the lowest-frequency coefficient 610 to the highest-frequency coefficient 612 along the diagonal interconnecting the DC coefficient 610 with the highest-frequency coefficient 612.

Next, the frequency-domain coefficients are quantized 614 to produce an 8×8 block of quantized frequency-domain coefficients 616. FIG. 7 illustrates an exemplary quantization of frequency-domain coefficients. Quantization employs an 8×8 quantization matrix Q 702. In one exemplary quantization process, represented by expression 704 in FIG. 7, each frequency-domain coefficient f(i,j) is multiplied by 8, and it is then divided, using integer division, by the corresponding value in quantization-matrix Q, $Q_{i,j}$, that may be first scaled by a scale factor. Quantized coefficients have small-integer values. Examination of the quantization-matrix Q reveals that, in general, higher frequency coefficients are divided by larger values than lower frequency coefficients in the quantization process. Since Q-matrix integers are larger for higher-frequency coefficients, the higher-frequency coefficients end up quantized into a smaller range of integers, or quantization bins. In other words, the range of quantized values for lower-frequency coefficients is larger than for higher-frequency coefficients. Because lower-frequency coefficients generally have larger magnitudes, and generally contribute more to a perceived image than higher-frequency coefficients, the result of quantization is that many of the higher-frequency quantized coefficients, in the lower right-hand triangular portion of the quantized-coefficient block 616, are forced to zero. Next, the block of quantized coefficients 618 is traversed, in zig-zig fashion, to create a one-dimensional vector of quantized coefficients 620. The one-dimensional vector of quantized coefficients is then encoded using various entropy-encoding techniques, generally run-length encoding followed by Huffman encoding, to produce a compressed bit stream 622. Entropy-encoding techniques take advantage of a non-uniform distribution of the frequency of occurrence of symbols within a symbol stream to compress the symbol stream. A final portion of the one-dimensional quantized-coefficient vector 620 with highest indices often contains only zero values. Run-length encoding can represent a long, consecutive sequence of zero values by a single occurrence of the value "0" and the length of the subsequence of zero values. Huffman encoding uses varying-bit-length encodings of symbols, with shorter-length encodings representing more frequently occurring symbols, in order to compress a symbol string.

Spatial encoding employs only information contained within a particular 8×8 spatial-domain block to encode the spatial-domain block. As discussed above, I frames are encoded by using only spatial encoding. In other words, each I frame is decomposed into 8×8 blocks, and each block is spatially encoded, as discussed above with reference to FIG. 6. Because the encoding of frames is not dependant on any other frames within a video signal, I frames serve as self-contained reference points that anchor the decoding process at regularly spaced intervals, preventing drift in the decoded signal arising from interdependencies between encoded frames.

Because a sequence of video frames, or video signal, often encodes a dynamic image of people or objects moving with respect to a relatively fixed background, a video camera panned across a background, or of a scene that is relatively static over a period of time, a sequence of video frames often contains a large amount of redundant information, some or much of which is translated or displaced from an initial position, in an initial frame, to a series of subsequent positions across subsequent frames. For this reason, detection of motion of images or sub-images within a series of video frames provides a means for relatively high levels of compression. Techniques to detect motion of images and sub-images within a sequence of video frames over time and use the redundant information contained within these moving images and sub-images is referred to as temporal compression.

Figure 8:
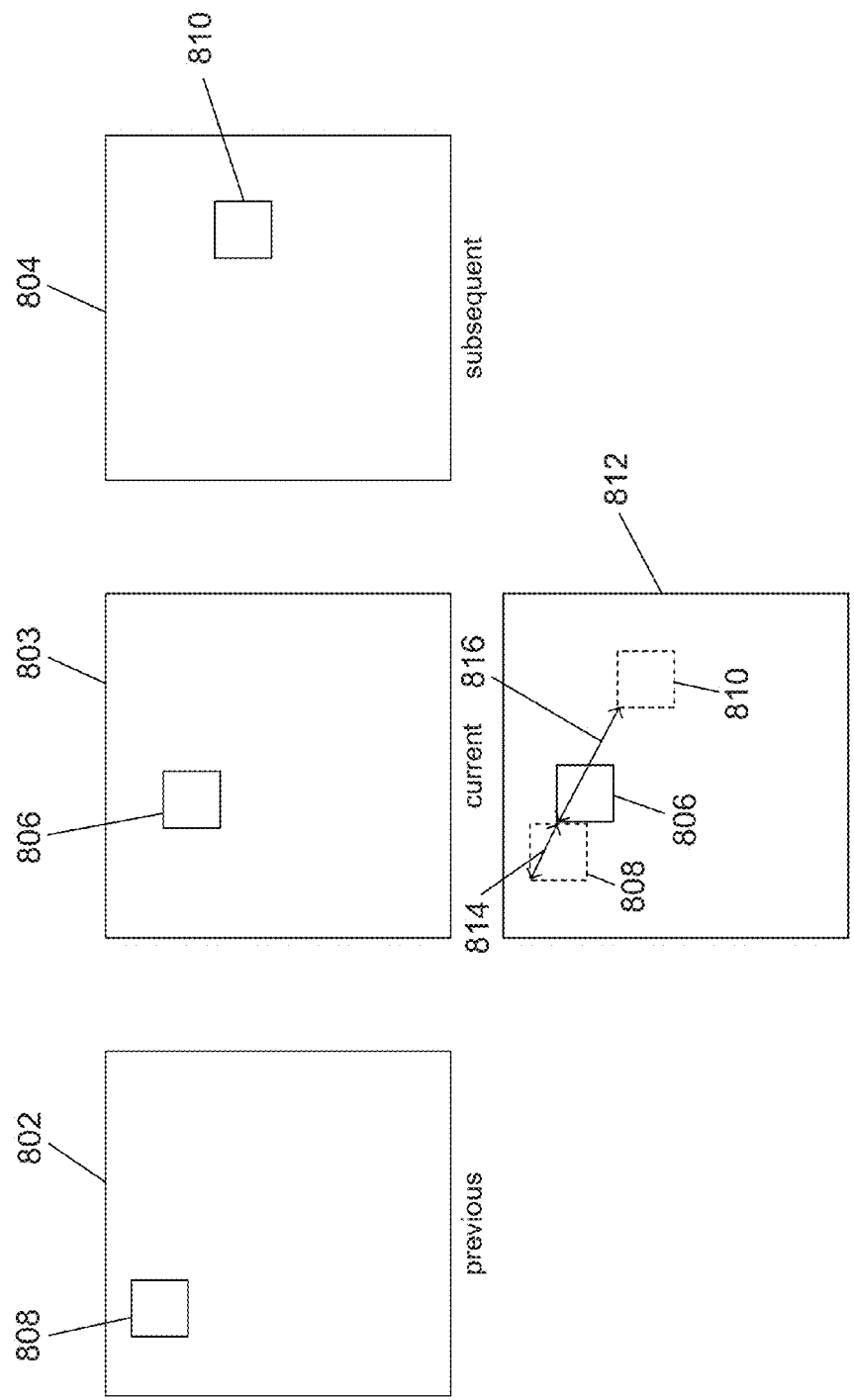
FIG. 8 illustrates sub-image movement across a sequence of frames and motion vectors that describe sub-image movement.

FIG. 8 illustrates sub-image movement across a sequence of frames and motion vectors that describe sub-image movement. In FIG. 8, three video frames 802-804 selected from a GOP are shown. Frame 803 is considered to be the current frame, or frame to be encoded and compressed. Frame 802 occurred in the original video-signal sequence of frames earlier in time than the current frame 803, and frame 804 follows frame 803 in the original video signal. A particular 16×16 macroblock 806 in the current frame 803 is found in a first, and different, position 808 in the previous frame 802 and in a second and different position 810 in the subsequent frame 804. Superimposing the positions of the macroblock 806 in the previous, current, and subsequent frames within a single frame 812, it is observed that the macroblock appears to have moved diagonally downward from the first position 808 to the second position 810 through the current position 806 in the sequence of frames in the original video signal. The position of the macroblock in the current frame 806 and two displacement, or motion, vectors 814 and 816 describe the temporal and spatial motion of the macroblock 806 in the time period represented by the previous, current, and subsequent frames. The basic concept of temporal compression is that macroblock 806 in the current frame can be encoded as either one or both of the motion vectors 814 and 816, since the macroblock will have been encoded in encodings of the previous and subsequent flames, and therefore represents redundant information in the current frame, apart from the motion-vector-based information concerning its position within the current frame.

Figure 9:
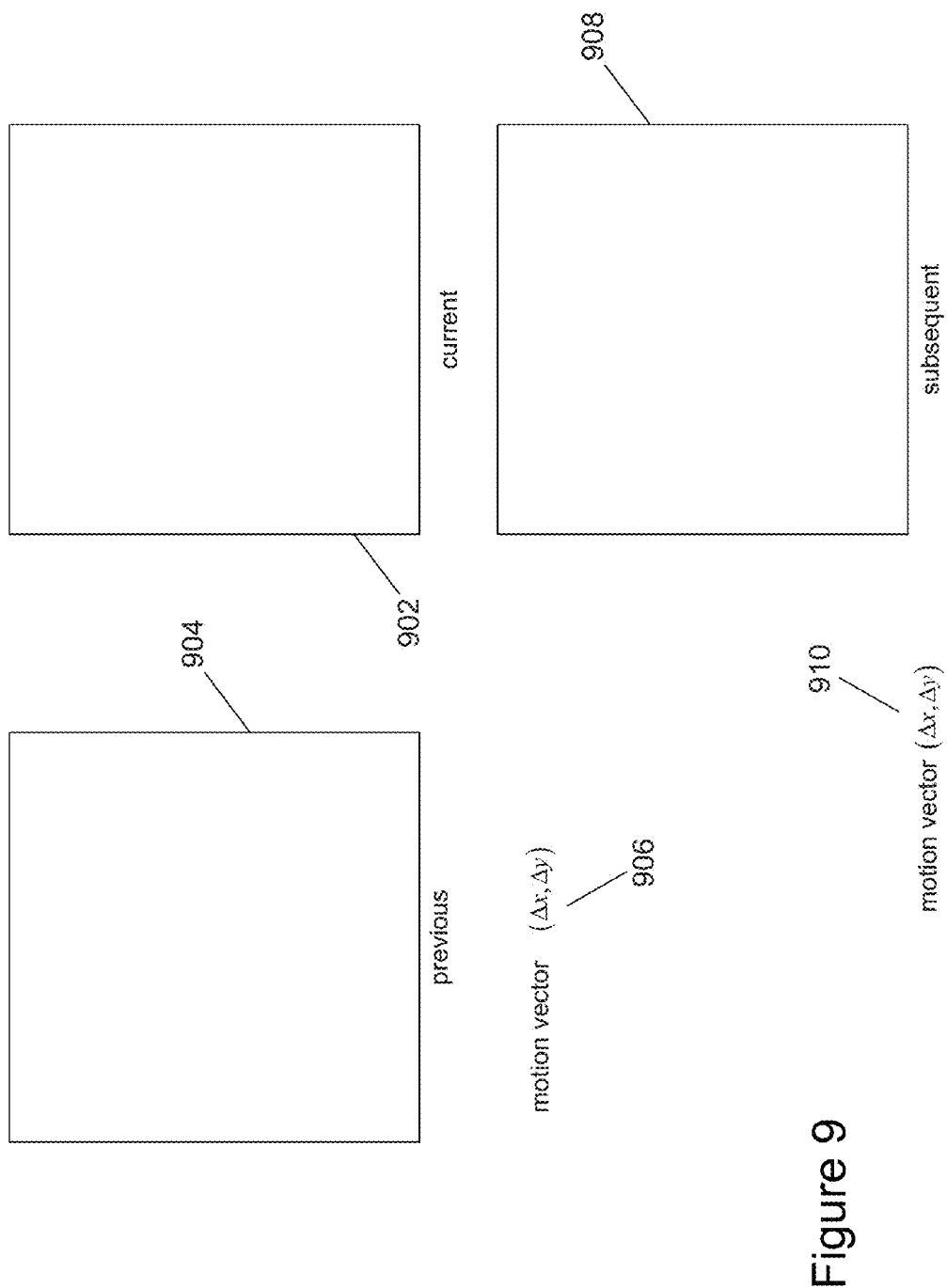
FIG. 9 shows the information used for temporal encoding of a current frame.

FIG. 9 shows the information used for temporal encoding of a current frame. Temporal encoding of a current frame uses the current frame 902 and either a single previous frame 904 and single motion vector 906 associated with the previous frame or both the previous frame and associated motion vector 904 and 906 and a subsequent frame 908 and associated motion vector 910. P-frame temporal encoding may use only a previous frame and a previous I frame or P frame, and B-frame encoding may use both a previous and subsequent I frame and/or P frame.

Figure 10:
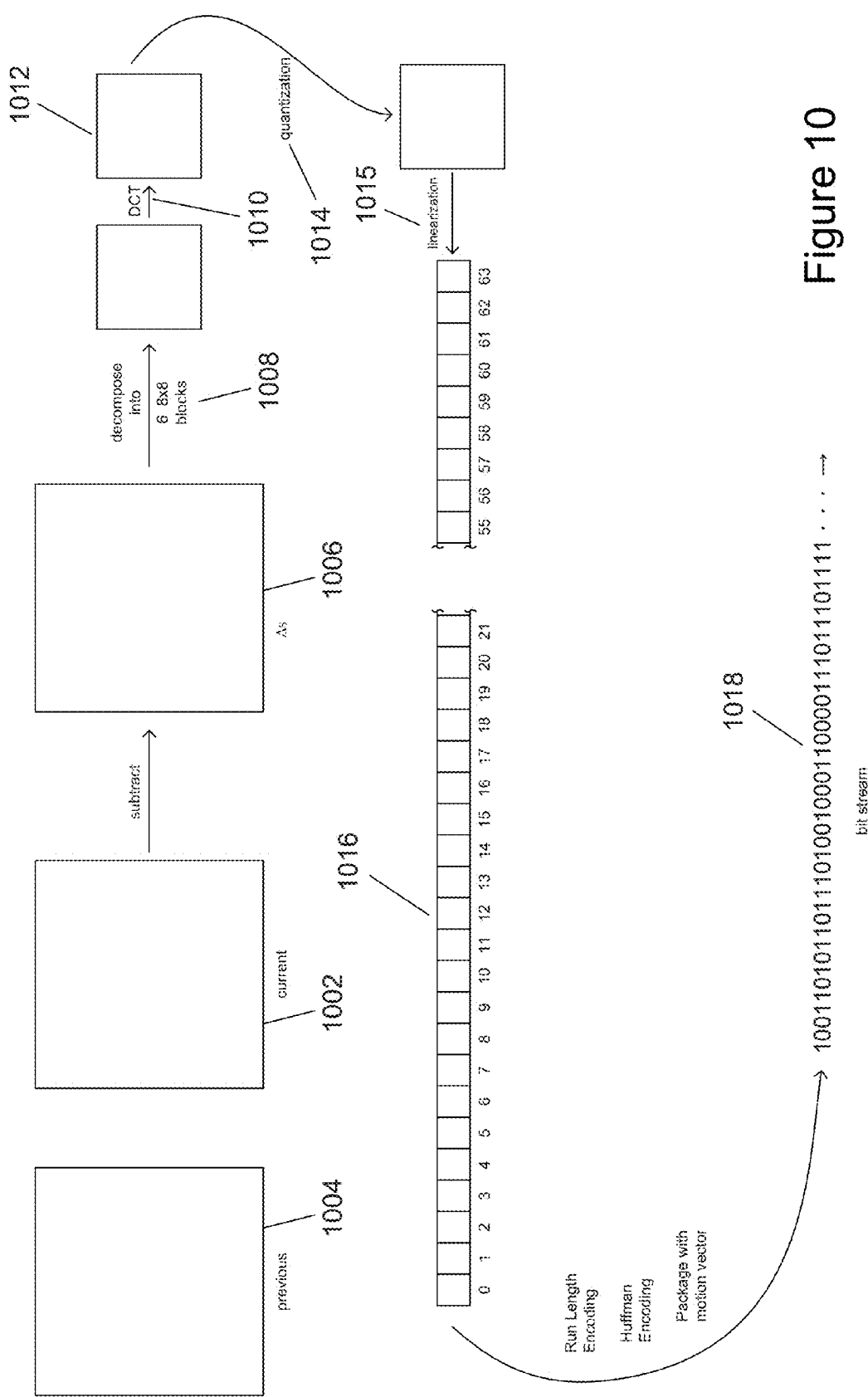
FIG. 10 illustrates P-frame temporal encoding.

FIG. 10 illustrates P-frame temporal encoding. In P-frame temporal encoding, a 16×16 current-frame macroblock 1002 and a 16×16 matching macroblock 1004 found in the previous frame are used for encoding the 16×16 current-frame macroblock 1002. The previous-frame macroblock 1004 is identified as being sufficiently similar to the current-frame macroblock 1002 to be compressible by temporal compression, and as the macroblock most similar to the current-frame macroblock. Various techniques can be employed to identify a best matching macroblock in a previous frame for a given macroblock within the current frame. A best-matching macroblock in the previous frame may be deemed sufficiently similar if the sum of absolute differences ("SAD") or sum of squared differences ("SSD") between corresponding values in the current-frame macroblock and best-matching previous-frame macroblock are below a threshold value. Associated with the current-frame macroblock 1002 and best-matching previous-frame macroblock 1004 is a motion vector (906 in FIG. 9). The motion vector may be computed as the horizontal and vertical offsets $\Delta x$ and $\Delta_y$, of the upper, left-hand cells of the current-frame and best-matching previous-frame macroblocks. The current-frame macroblock 1002 is subtracted from the best-matching previous-frame macroblock 1004 to produce a residual macroblock 1006. The residual macroblock is then decomposed into six 8×8 blocks 1008, as discussed above with reference to FIG. 5, and each of the 8×8 blocks is transformed by a DCT 1010 to produce an 8×8 block of frequency-domain coefficients 1012. The block of frequency-domain coefficients is quantized 1014 and linearized 1015 to produce the one-dimensional vector of quantized coefficients 1016. The one-dimensional vector of quantized coefficients 1016 is then run-length encoded and Huffman encoded, and packaged together with the motion vector associated with the current-frame macroblock 1002 and best-matching previous-frame macroblock 1004 to produce the compressed bit stream 1018. The temporal compression of a P block is carried out on a macroblock-by-macroblock basis. If no similar macroblock for a particular current-frame macroblock can be found in the previous frame, then the current-frame macroblock can be spatially encoded, as discussed above with reference to FIG. 6. Either a previous I frame or a previous P frame can be used for the previous frame during temporal encoding of a current frame.

Figure 11:
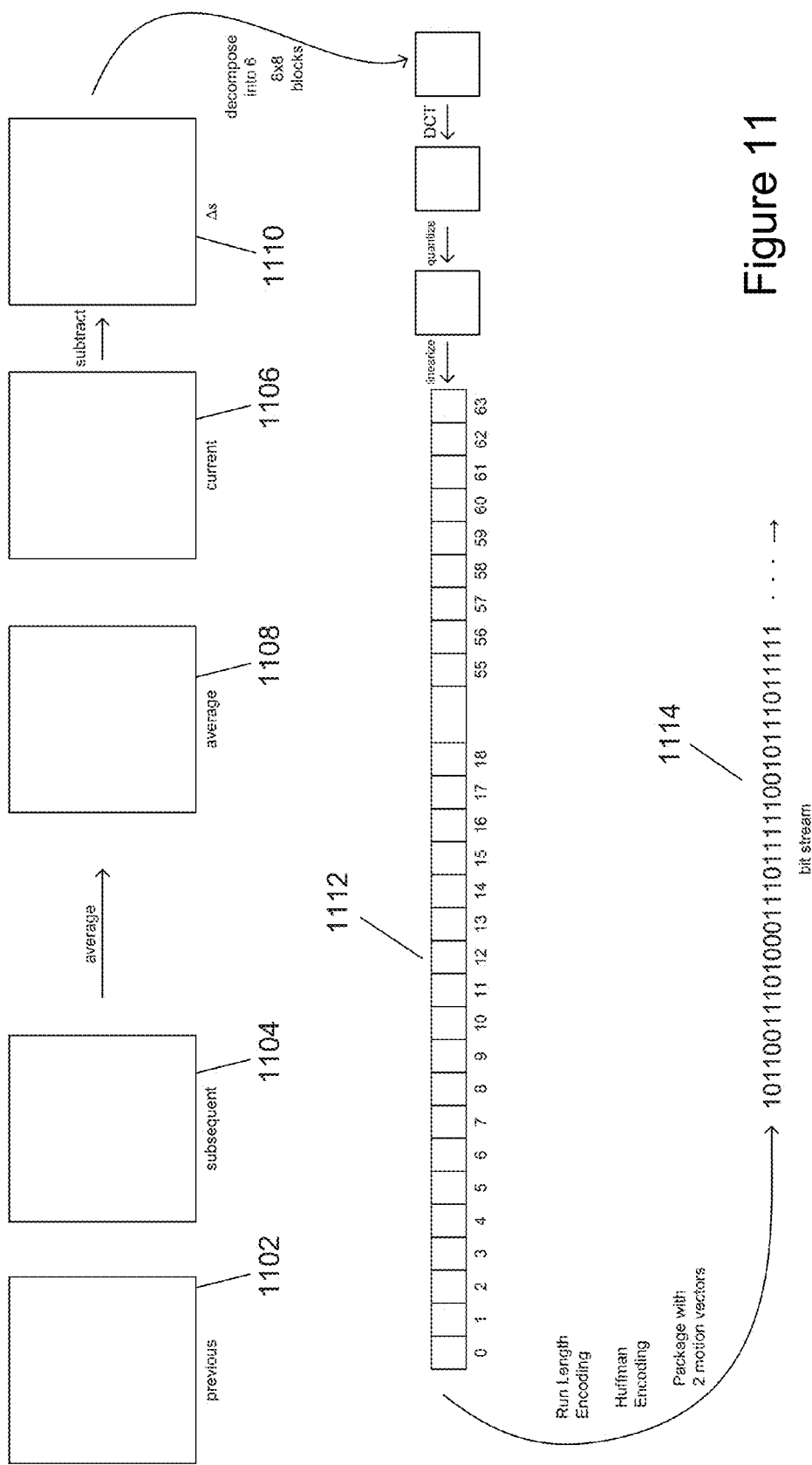
FIG. 11 illustrates B-frame temporal encoding.

FIG. 11 illustrates B-frame temporal encoding. Many of the steps in B-frame temporal encoding are identical to those in P-frame encoding. In B-frame encoding, a best-matching macroblock from a previous frame 1102 and a best-matching macroblock from a subsequent frame 1104 corresponding to a current-frame macroblock 1106 are averaged together to produce an average matching frame 1108. The current-frame macroblock 1106 is subtracted from the average matching macroblock 1108 to produce a residual macroblock 1110. The residual macroblock is then spatially encoded in exactly the same manner as the residual macroblock 1006 in P-frame encoding is spatially encoded, as described in FIG. 10. The one-dimensional quantized-coefficient vector 1112 resulting from spatial encoding of the residual macroblock is entropy encoded and packaged with the two motion vectors associated with the best-matching previous-frame macroblock 1102 and the best-matching subsequent-frame macroblock 1104 to produce a compressed bit stream 1114. Each macroblock within a B frame may be temporally compressed using only a best-matching previous-frame macroblock and associated motion vector, as in FIG. 10, only a best-matching subsequent-frame macroblock and associated motion vector, or with both a best-matching previous-frame macroblock and associated motion vector and a best-matching subsequent-frame macroblock and associated motion vector, as shown in FIG. 11. In addition, if no matching macroblock can be found in either the previous or subsequent frame for a particular current-frame macroblock, then the current-frame macroblock may be spatially encoded, as discussed with reference to FIG. 6. Previous and subsequent frames may be either P or I frames.

Figure 12:
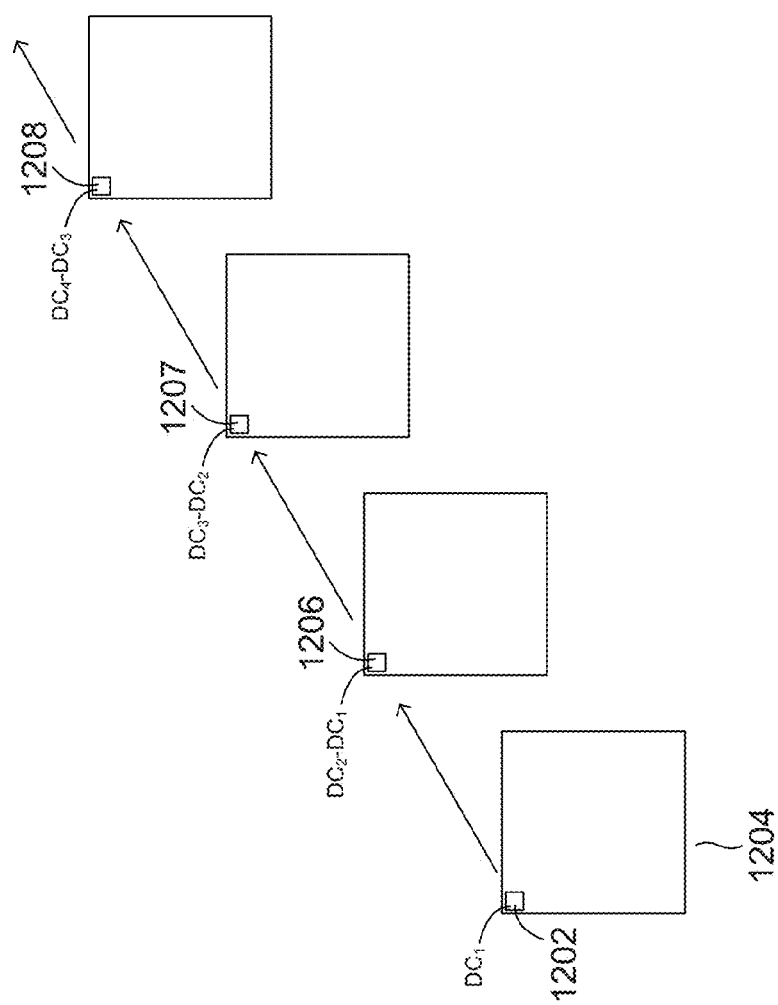
FIG. 12 illustrates DC encoding.

FIG. 12 illustrates DC encoding. As discussed above, the $F_{(0,0)}$ coefficient of the frequency domain represents the average intensity within the spatial domain. The DC coefficient is the single most important piece of information with respect to high-fidelity frame reconstruction. Therefore, the DC coefficients are generally represented at highest-possible resolution, and are encoded by DCPM encoding. In DCPM encoding, the DC coefficient 1202 of the first I frame 1204 is encoded into the bit stream, and, for each DC coefficient of subsequent frames 1206-1208, the difference between the subsequent-frame DC coefficient and the first reference frames DC coefficient 1202 is encoded in the bit stream.

Decoding of the compressed bit stream (150 in FIG. 2) generated by the video encoding method discussed above with reference to FIGS. 1-13, is carried out by reversing the encoding steps. Entropy decoding of the bit stream returns one-dimensional quantized-coefficient vectors for spatially-encoded blocks and for residual blocks generated during temporal compression. Entropy decoding also returns motion vectors and other header information that is packaged in the compressed bit stream to describe the encoded information and to facilitate decoding. The one-dimensional quantized-coefficient arrays can be used to generate corresponding two-dimensional quantized coefficient blocks and quantized residual blocks and the quantized-coefficient blocks and quantized residual blocks can be then converted into reconstructed frequency-domain coefficient blocks. Reconstruction of the frequency-domain coefficient blocks generally introduces noise, since information was lost in the quantization step of the encoding process. The reconstructed frequency-domain-coefficient blocks can then be transformed, using an inverse DCT, to the spatial domain, and reassembled into reconstructed video frames, with residual frames added back to macroblocks found by motion vectors in already reconstructed frames during inverse temporal encoding.

A Currently Available Video-Display Device and Proposed Improvement

Figure 13A:
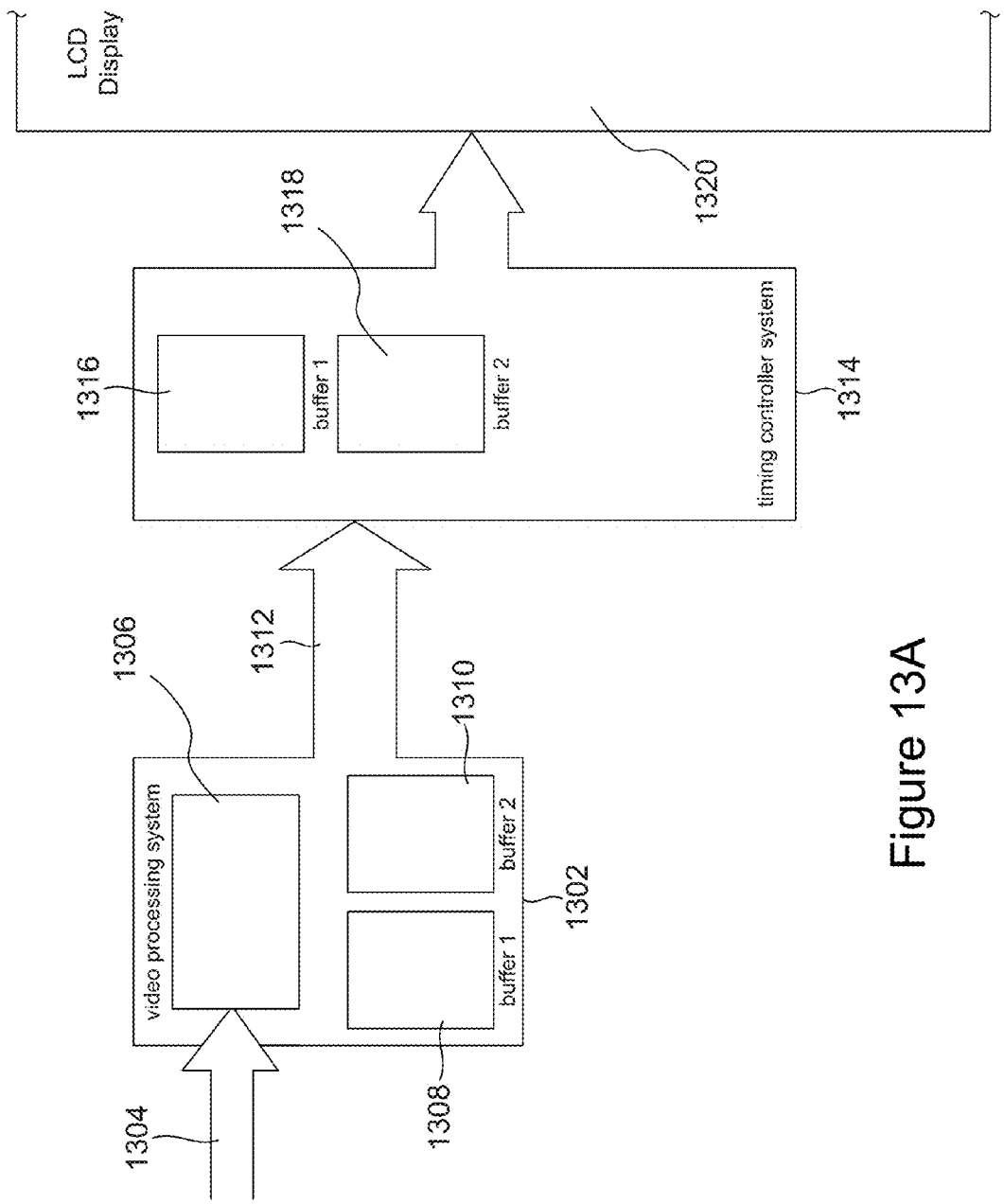
FIGS. 13A-F illustrate operation of a currently available video-display device.

FIGS. 13A-I illustrate operation of a currently available video-display device. The video-display device, as shown in FIG. 13A, consists of a video processing system 1302 which receives compressed and encoded video data 1304 as input, referred to as a "video signal," processes the input video signal using an internal processor and/or logic circuitry 1306 to produce decompressed and decoded video frames that are stored in video-frame buffers 1308 and 1310, and transmits decompressed and decoded video frames via an internal communications medium 1312 to a timing controller system 1314. The timing controller system 1314 receives the decompressed and decoded video frames from the video-processing system 1302 in video-frame buffers 1316 and 1318, from which the timing controller then reads the video frames in order to control a display panel 1320 to display the video frames to one or more viewers. The video-display device described in FIG. 13A displays the video frames on a liquid-crystal display panel comprising a two-dimensional matrix of display elements, each, in turn, comprising three differently colored display-element components which can be electronically controlled to emit red, green, and blue light, respectively. Each display element is referred to, in the current document, as a "pixel."

The video processing system 1302 is primarily responsible for the computationally intensive task of decompressing and decoding the compressed and encoded video data signal received through broadcast media or through electronic communications media. As discussed in greater detail below, two video-frame buffers 1308 and 1310 are used to avoid READ/WRITE conflicts both in the video processing system and in the timing-controller system. The internal communications medium 1312 is, in many LCD display devices, a set of pairs of low-voltage differential signaling ("LYDS") signal lines, such as those used in the serial attached SCSI ("SAS") and PCIe communications media. LVDS-based communications media feature high bandwidths and flexible configuration. Additional pairs of LVDS lines can be added, for example, to increase the bandwidth of an LVDS-based communications medium in incremental fashion. However, each additional pair of LVDS signal lines increases implementation cost and adds design complexity.

Figure 13B:
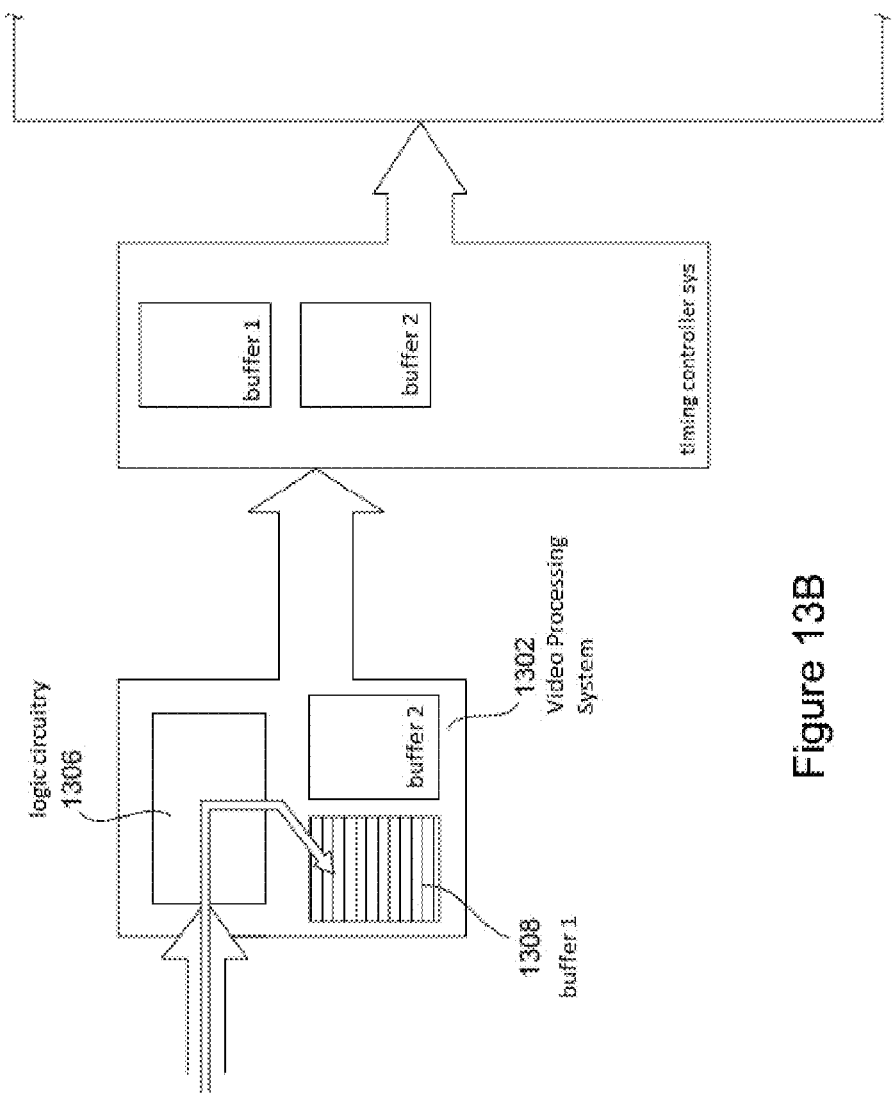
Figure 13C:
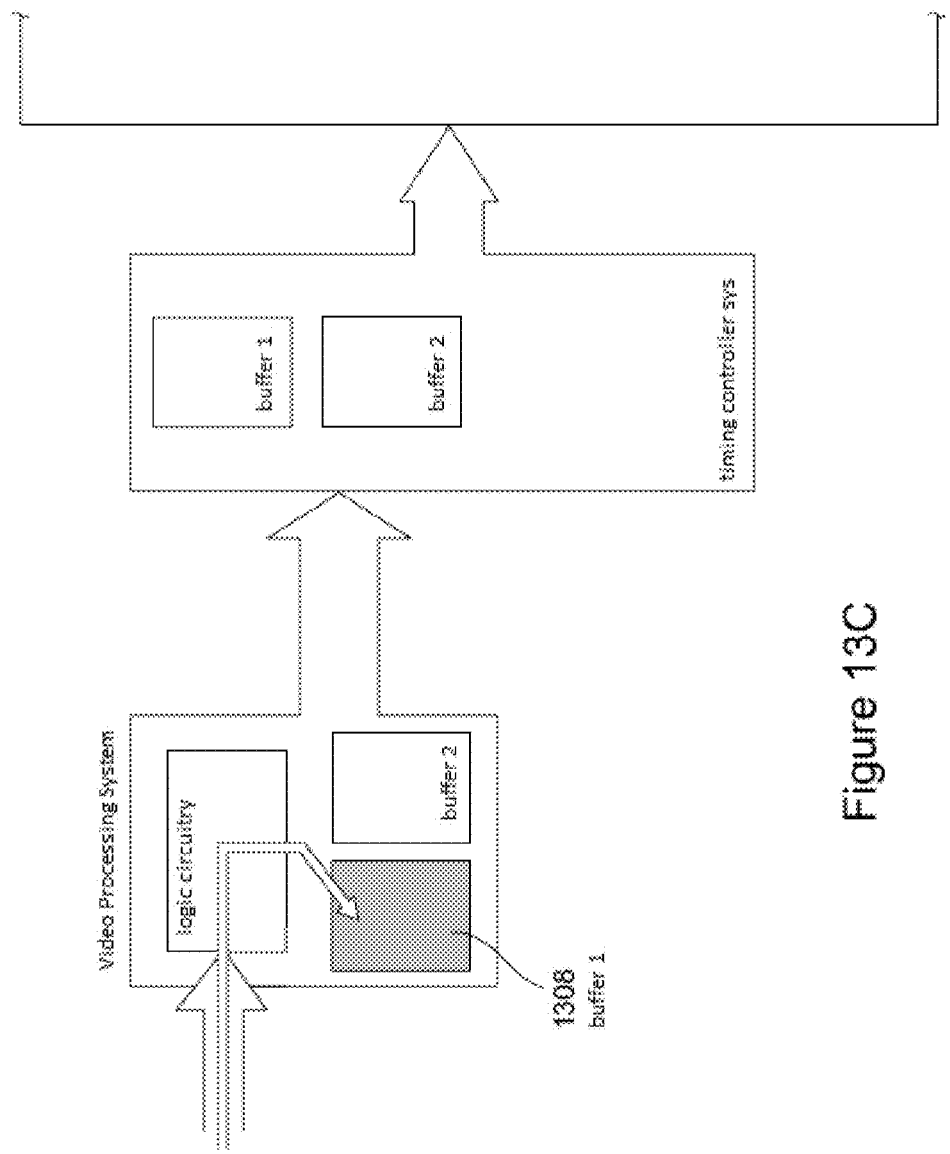
Figure 13D:
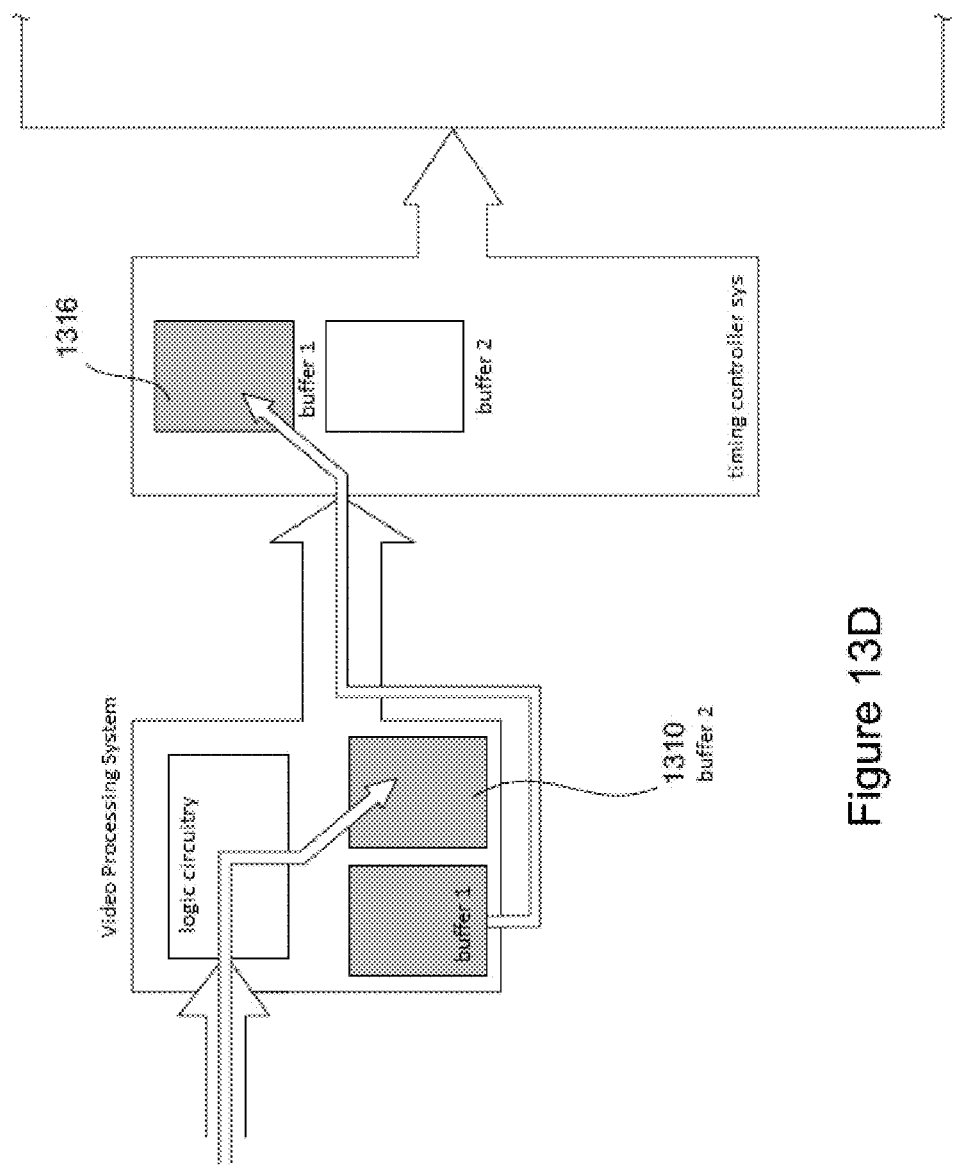
Figure 13E:
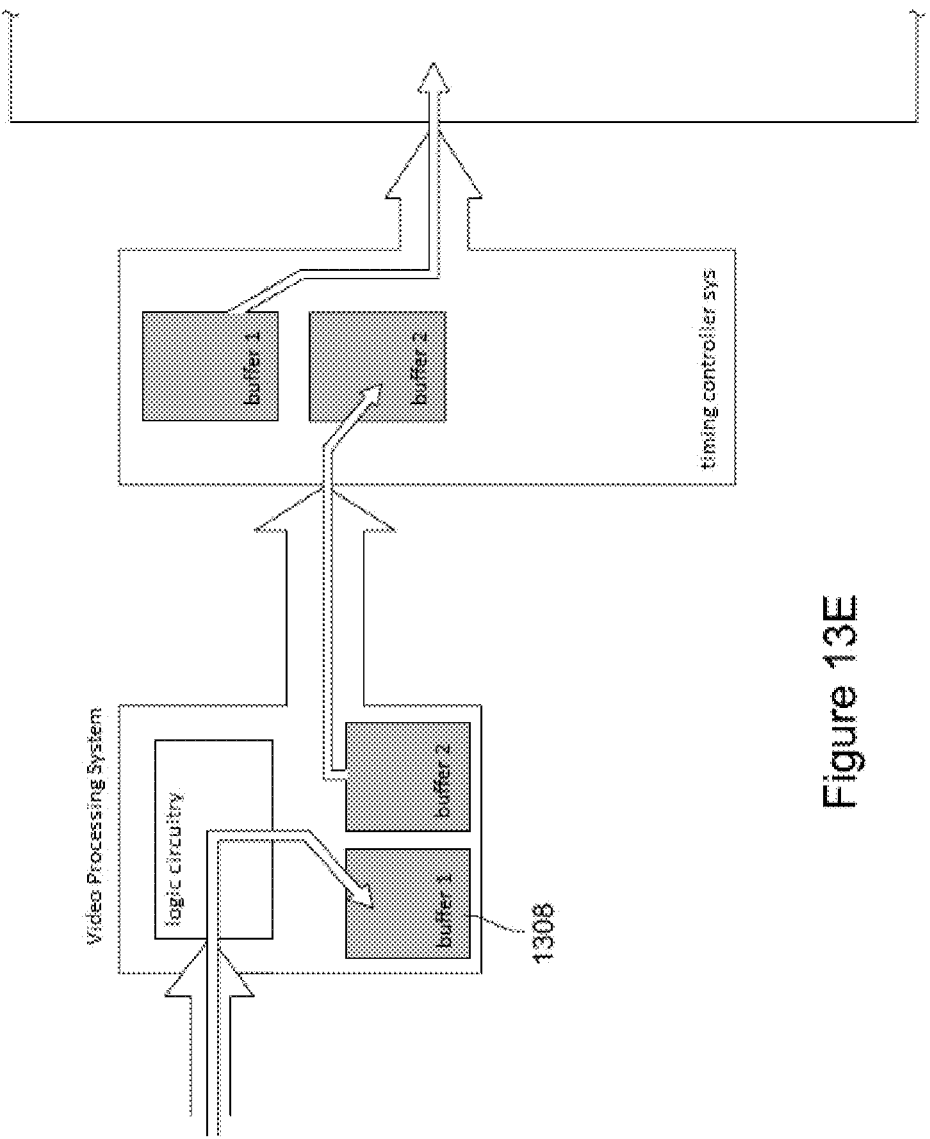
Figure 13F:
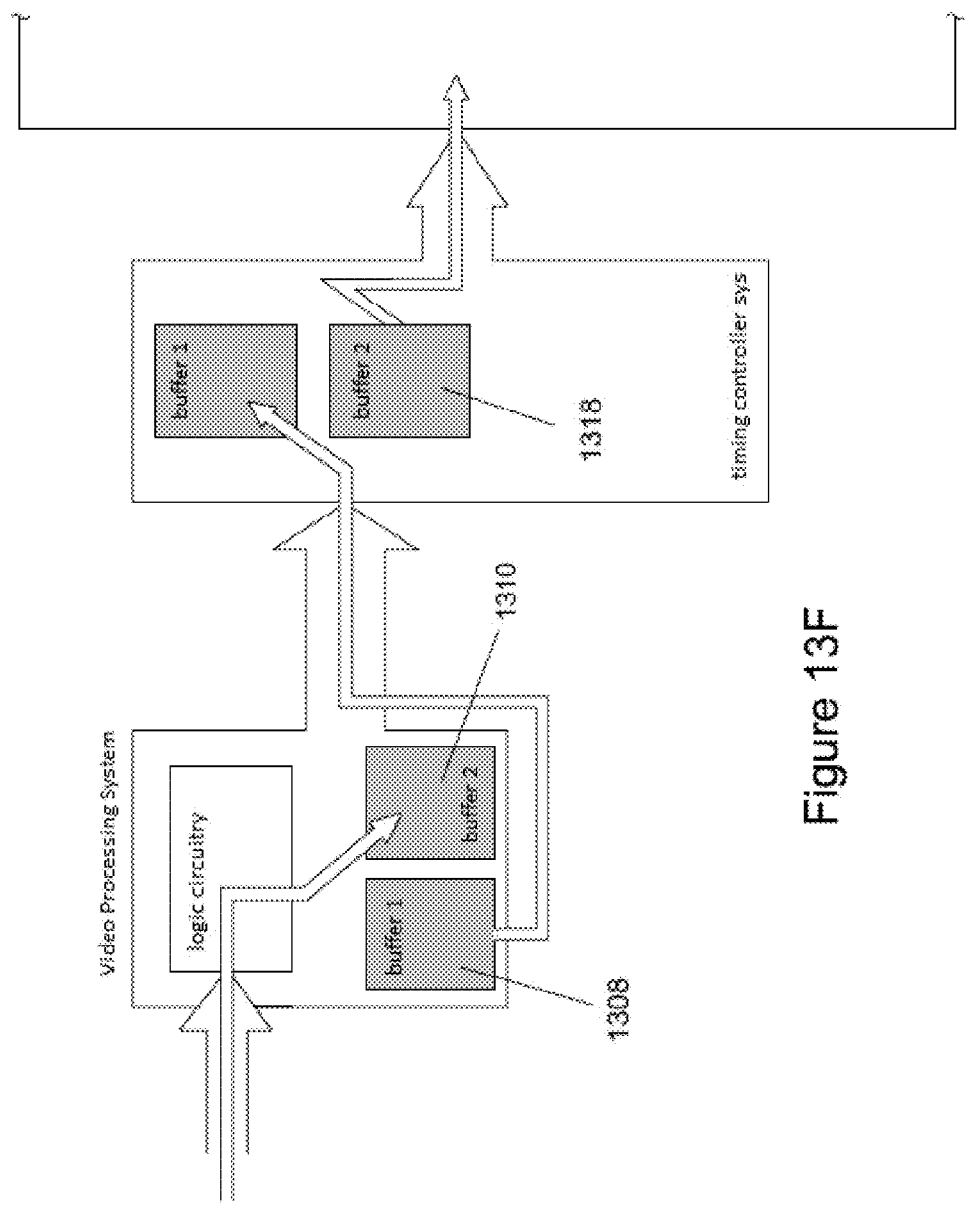

As shown in FIG. 13B, at the onset of video display, a first frame is decompressed and decoded from the video stream by the processor 1306 of the video processing system 1302 and stored in the first video-frame buffer 1308. In many currently-available systems, half-resolution frames are received at approximately the frame display rate. Thus, in FIG. 13B, the first half-resolution frame is placed in the video-frame buffer 1308, represented with crosshatching. The next frame is decompressed and decoded and, as shown in FIG. 13C, is added to the first half-resolution frame to produce a complete, full-resolution video frame stored in video-frame buffer 1308. LC displays carry out progressive display of full-resolution frames, unlike CRT displays, which display interleaved fields, each comprising alternate lines of a CRT display. As shown in FIG. 13D, the processor begins constructing a next video frame in the second video-frame buffer 1310 as the frame stored in the first frame buffer 1308 is transmitted to the first frame buffer 1316 in the timing-controller system 1314. The next video frame is constructed from a next decompressed and decoded half-resolution frame and the previously constructed frame, using a deinterleaving process that creates a full resolution frame. The deinterleaving process allows construction of full-resolution frames at the rate at which half-resolution frames are received, decompressed, and decoded. Double buffering is employed so that video data from the first video frame can be transmitted to the timing-controller system while newly decompressed and decoded video data can be written into the second video-frame buffer, and vice-versa. Next, as shown in FIGS. 13E-F, the process continues indefinitely, as video frames are continuously decompressed and decoded by the video processing system. A next frame is constructed in the first video-frame buffer 1308, as shown in FIG. 13E, while the already constructed video frame in the second video-frame buffer 1310 is being transmitted to the second video-frame buffer 1318 in the timing-controller system of 1314. Then, as shown in FIG. 13F, the buffers are switched, so that the next video frame is constructed in the second video-frame buffer 1310 of the video processing system 1302 while the already constructed video frame in the first video-frame buffer 1308 is transferred to the first video-frame buffer 1316 of the timing-controller system 1314. In the video-processing system, a next frame is being constructed, at any given time, from newly decompressed and decoded video data while, at the same time, an already-constructed frame is being transmitted to the timing-controller system. In the timing-controller system, a next frame is being received in one of the two video-frame buffers while, at the same time, an already-received video frame in a different video-frame buffer is being read and transformed into LCD-display-control signals transmitted to the LCD panel.

Figure 14:
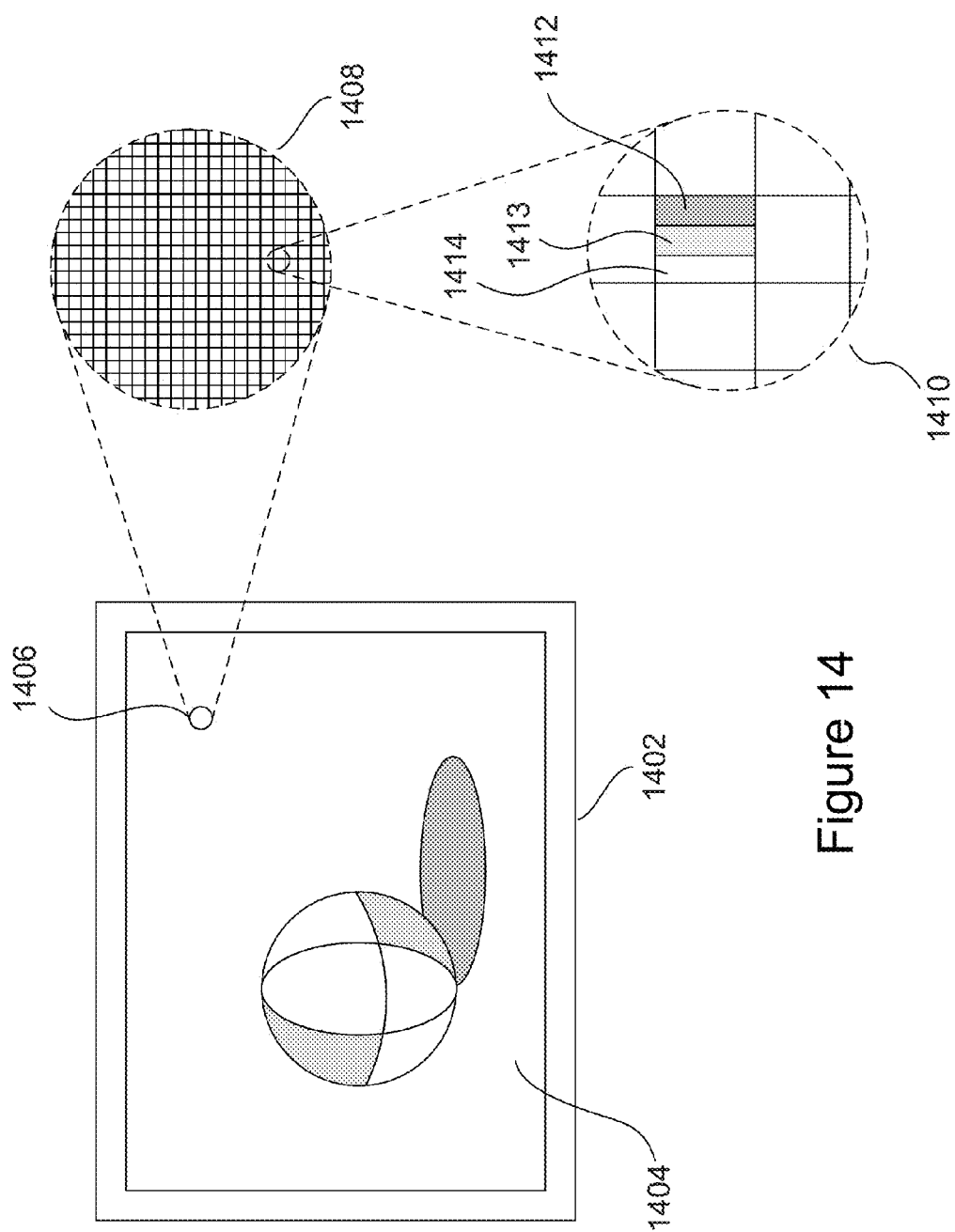
FIG. 14 illustrates an LCD display.

FIG. 14 illustrates an LCD display. The LCD display 1402 displays a video sequence 1404 on a two-dimensional matrix of pixel elements. As shown in FIG. 14, any small portion of the LCD display 1406 under magnification or close inspection appears as a two-dimensional matrix of display elements, or pixels 1408. On even greater magnification 1410, each pixel can be seen to comprise three sub-elements 1412-1414 that, when electronically controlled to do so, emit blue, green, and red light, respectively. A pixel can emit light of one color selected from a range of different colors at an intensity selected from a range of intensities.

LCD displays are sample-and-hold devices. When a pixel is electronically controlled to emit light of a particular color and intensity, the pixel continues to emit light of the particular color and intensity until a next point in time at which the pixel is controlled to emit light of a different color and/or intensity. The sample-and-hold characteristic of LCD displays differs from that of a CRT screen, in which an electron gun scans across a phosphor-coated surface to illuminate pixels, the intensity of emission of which decay as the scan passes onto a next portion of the surface of the phosphor-coated screen.

Unfortunately, sample-and-hold displays introduce a perceptible blurring of moving objects. FIG. 15 illustrates this blurring of moving objects by sample-and-hold display devices. FIG. 15 shows a first portion of a video image displaying a moving object in an ideal fashion 1502 as well as in the decidedly non-continuous fashion 1504 produced by sample-and-hold display devices. Ideally, a moving object that moves from position 1506 to position 1508 would appear, to the observer, as a sequence of object images 1506, 1508, and 1510-1512 at relatively small incremental changes in position that would allow the observer's vision system to easily provide an illusion of continuous motion. In a CRT-based display, the intensity of pixels decay over the inter-frame interval, assisting the human visual system to provide an illusion of continuous motion. However, in a sample-and-hold display device, the object is displayed at a first position 1520 for a full frame-display interval, suddenly shifts to a second position 1522 for a second full frame-display interval, and then shifts again to a third position 1524. In other words, the sample-and-hold display device fails to provide a perception of continuous motion, resulting in a perceived blurring of an object in motion by the human visual system. A human observer sees the moving object blurred over the region containing the three discrete object images 1520, 1522, and 1524.

Figure 16A:
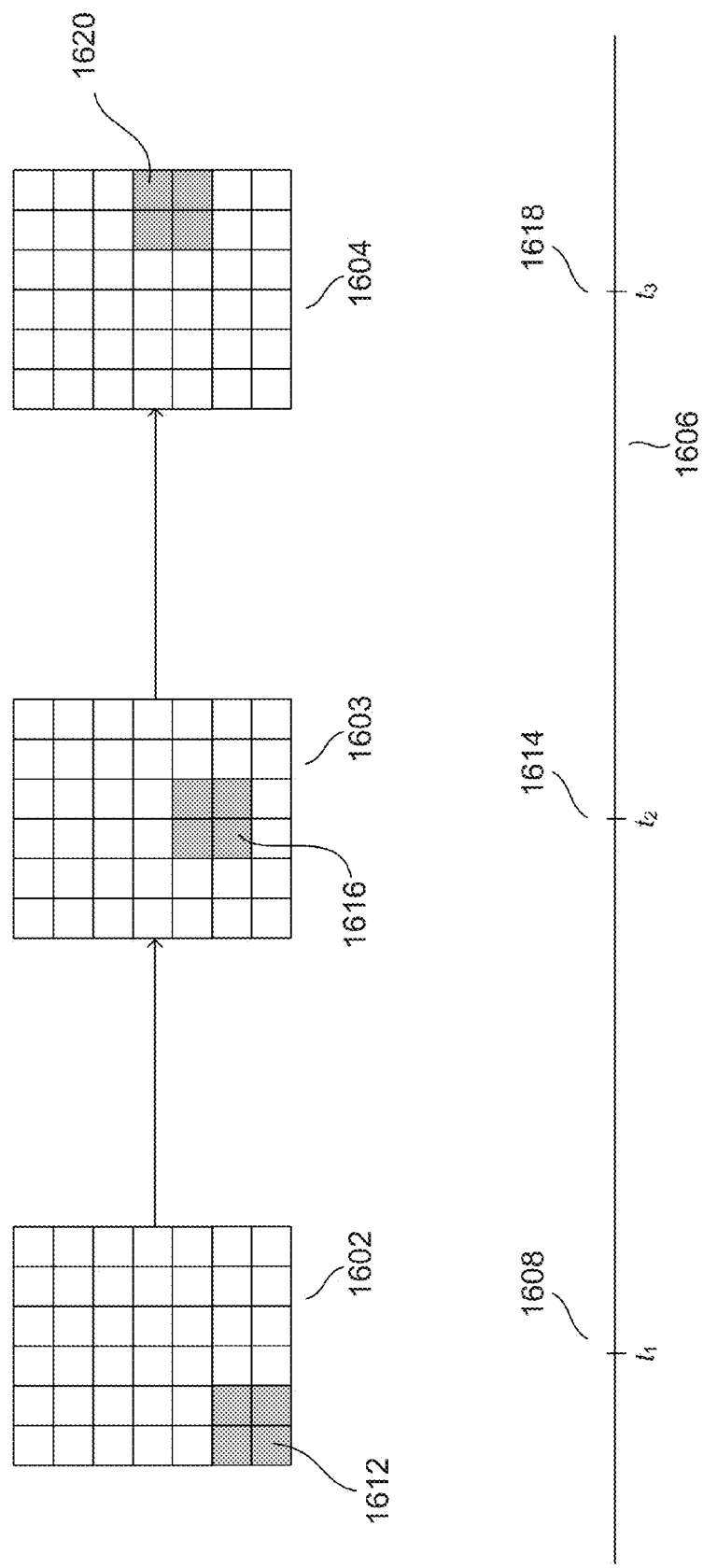
FIGS. 16A-B illustrate one potential solution to the blurring problem inherent in sample-and-hold display devices with low and medium frame-display rates.
Figure 16B:
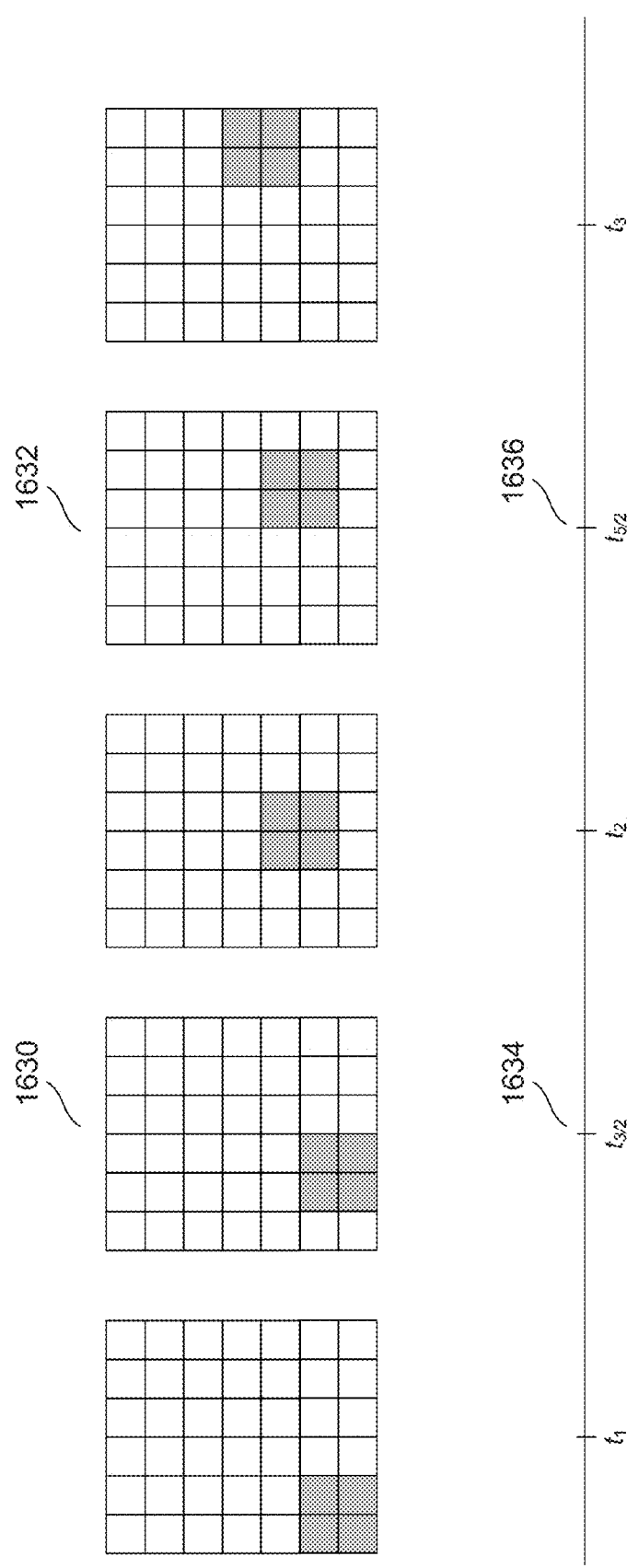

FIGS. 16A-B illustrate one potential solution to the blurring problem inherent in sample-and-hold display devices with low and medium frame-display rates. In FIG. 16A, three small portions of a digitally encoded video sequence 1602-1604 are shown plotted with respect to a time line 1606. At time $t_1$ 1608, a video-frame portion 1602 includes a small object 1612 in the lower left-hand corner. At time $t_2$ 1614, a new video-frame portion is displayed in which the object has moved to a new position 1616. The initial video-frame portion 1602 is displayed continuously from time $t_1$ to time $t_2$. The video-frame portion 1603 is displayed continuously from time $t_2$ 1614 to time $t_3$ 1618, at which point a next video-frame portion 1604 is displayed. Note that the object has moved yet further to a new position 1620. As discussed with reference to FIG. 15, this discontinuous jumping of the moving object from one position to another at points in time corresponding to frame display is perceived by a human viewer as a blurring of the object.

FIG. 16B illustrates one approach to ameliorating the blurring of rapidly moving objects in a video scene introduced by a sample-and-hold display device. As shown in FIG. 16B, two new frame portions 1630 and 1632 have been introduced at times $t_{\frac{2}{3}}$

1634 and 1636, respectively. By introducing the two new, interleaving frames, motion in the horizontal direction is relatively more continuous, in the sequence of five frame portions shown in FIG. 16B than in the sequence of three frame portions shown in FIG. 16A. However, due to the lower limit on object boundaries resulting from finite pixel size, motion in the vertical direction is still fixed in the interval $t_1$ to $t_2$ and in the interval $t_2$ to $t_3$. However, the five frame portions shown in FIG. 16B, when displayed at a frame-display rate double that of the frame-display rate of the frame portions shown in FIG. 16A, produces a significant amelioration of the perceived, blurring of rapidly moving objects. Unfortunately, video signals are captured at a fixed frame-capture rate, and the desire to ameliorate blurring by introducing additional, interleaving frames into a frame sequence cannot be accomplished by increasing the frame-capture rate.

Figure 17:
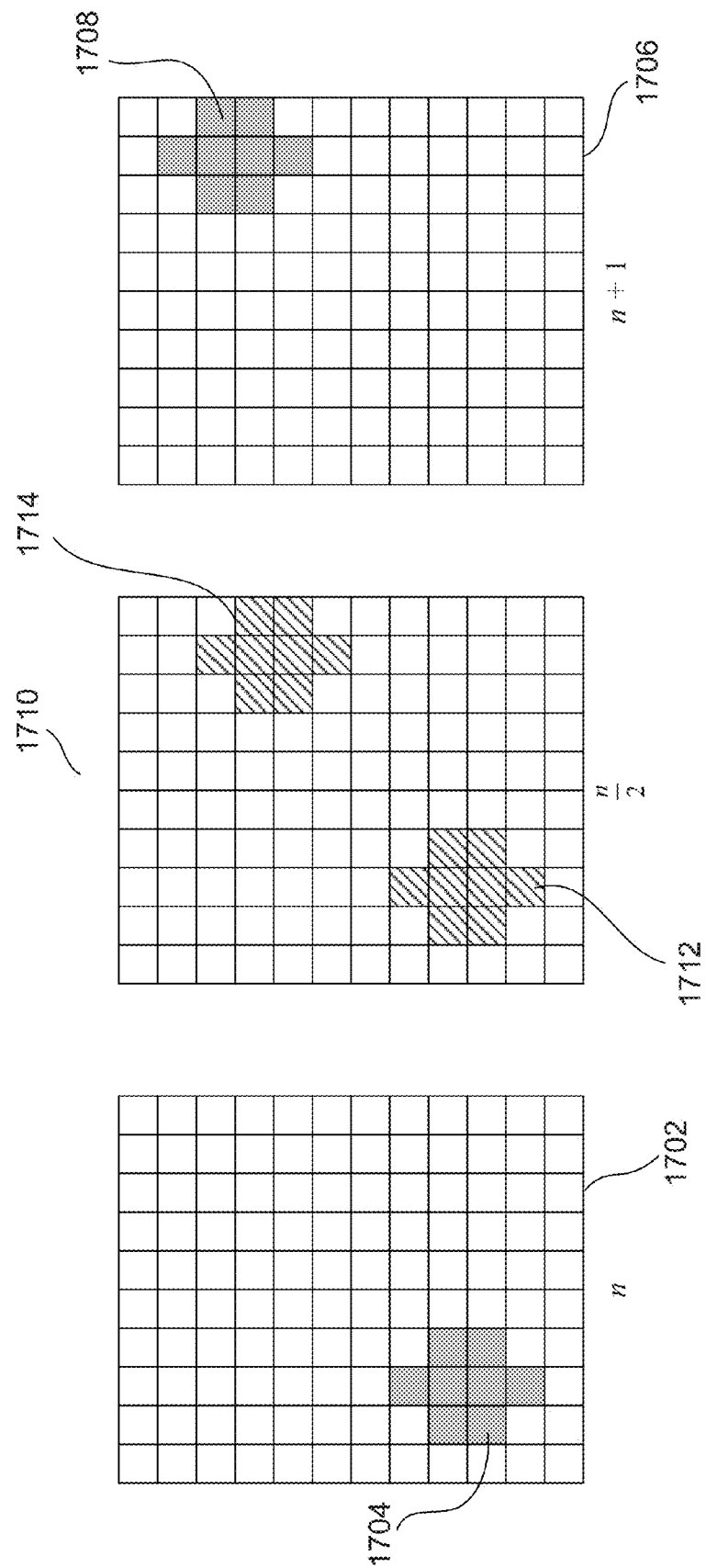
FIG. 17 illustrates one method by which intervening frames can be generated to increase the frame-display rate in a sample-and-hold video-display device.

FIG. 17 illustrates one method by which intervening frames can be generated to increase the frame-display rate in a sample-and-hold video-display device. FIG. 17 shows a frame n 1702 containing a small moving object 1704 and a frame portion n+1 1706 in which the small moving object has moved to a different position 1708. An interleaving $\frac{n}{2}$ frame 1710 can be generated by averaging the pixel values of frame portions n and n+1. In other words, the pixel value for each pixel $P_{i,j}$ in the frame $\frac{n}{2}$ is computed as:

$$P_{i,j}\left(\frac{n}{2}\right) = \frac{1}{2}(P_{i,j}(n) + P_{i,j}(n+1))$$

As shown in FIG. 17, this does not lead to a perfect interpolation, where the object appears in an intermediate position, but instead produces two half-intensity images 1712 and 1714 of the object. However, by increasing the frame-display rate, and providing an additional motion clue to the human visual system, the result is a significant decrease in perceived blurring. In alternative designs, alternative types of frame interpolation may be used, including different types of pixel-combination functions.

Figure 18:
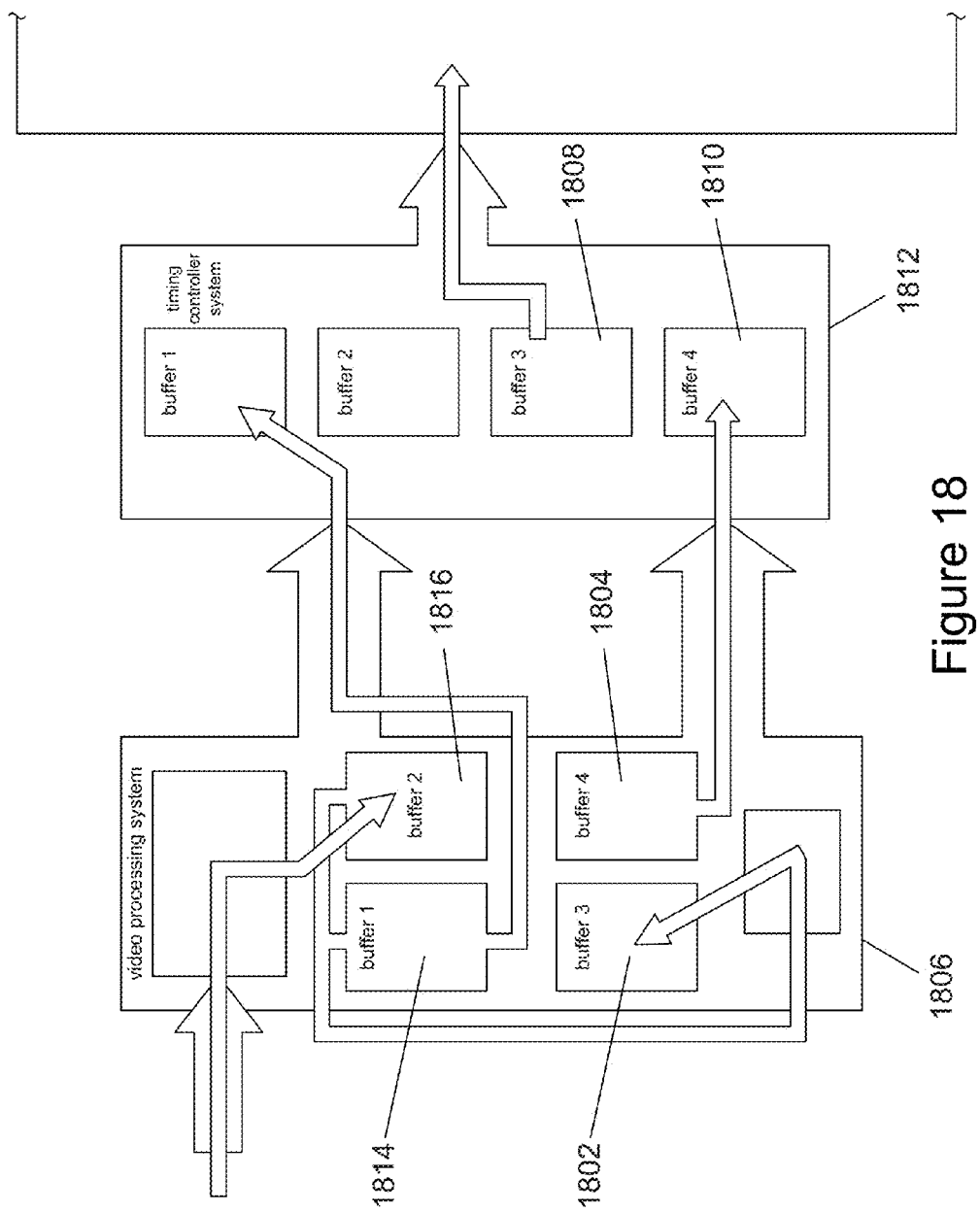
FIG. 18 illustrates changes to the video-display device described with reference to FIG. 13A in order to implement frame interpolation to double the frame-display rate, as discussed above with reference to FIGS. 16A-17.

FIG. 18 illustrates changes to the video-display device described with reference to FIG. 13A in order to implement frame interpolation to double the frame-display rate, as discussed above with reference to FIGS. 16A-17. Two additional video-frame buffers 1802 and 1804 have been added to the video-processing system 1806, and two additional video-frame buffers 1808 and 1810 have been added to the timing-controller system 1812. While the already-constructed video frame in video-frame buffer 1 1814 is being transmitted from the video-processing system 1806 to the timing-controller system 1812, and while a next frame is being decompressed and decoded and constructed in video-frame buffer 2 1816, an interpolated frame is being generated and placed in buffer 3 1802. The video frame already constructed in buffer 4 1804 is being transferred to buffer 4 1810 of the timing-controller system 1812. Concurrently, the already-received video frame in buffer 3 1808 of the timing-controller system 1812 is being displayed on the display monitor. Frame interpolation is carried out in the video-processing system 1806, since the video-processing system has the computational resources for this rather computationally expensive process.

Implementation of the improved, higher frame-display-rate device shown in FIG. 18 involves significantly increased cost and design complexities. The video-processing system 1806 and the timing-controller system 1812 each requires doubling of the memory needed for video-frame buffers, and the signal lines of the intercommunications media between the video-processing system and timing-controller system need also to be doubled, in order to provide the additional bandwidth needed to transmit twice as many frames, per second, between the video-processing system and the timing-controller system.

Embodiments of the Present Invention

Figure 19:
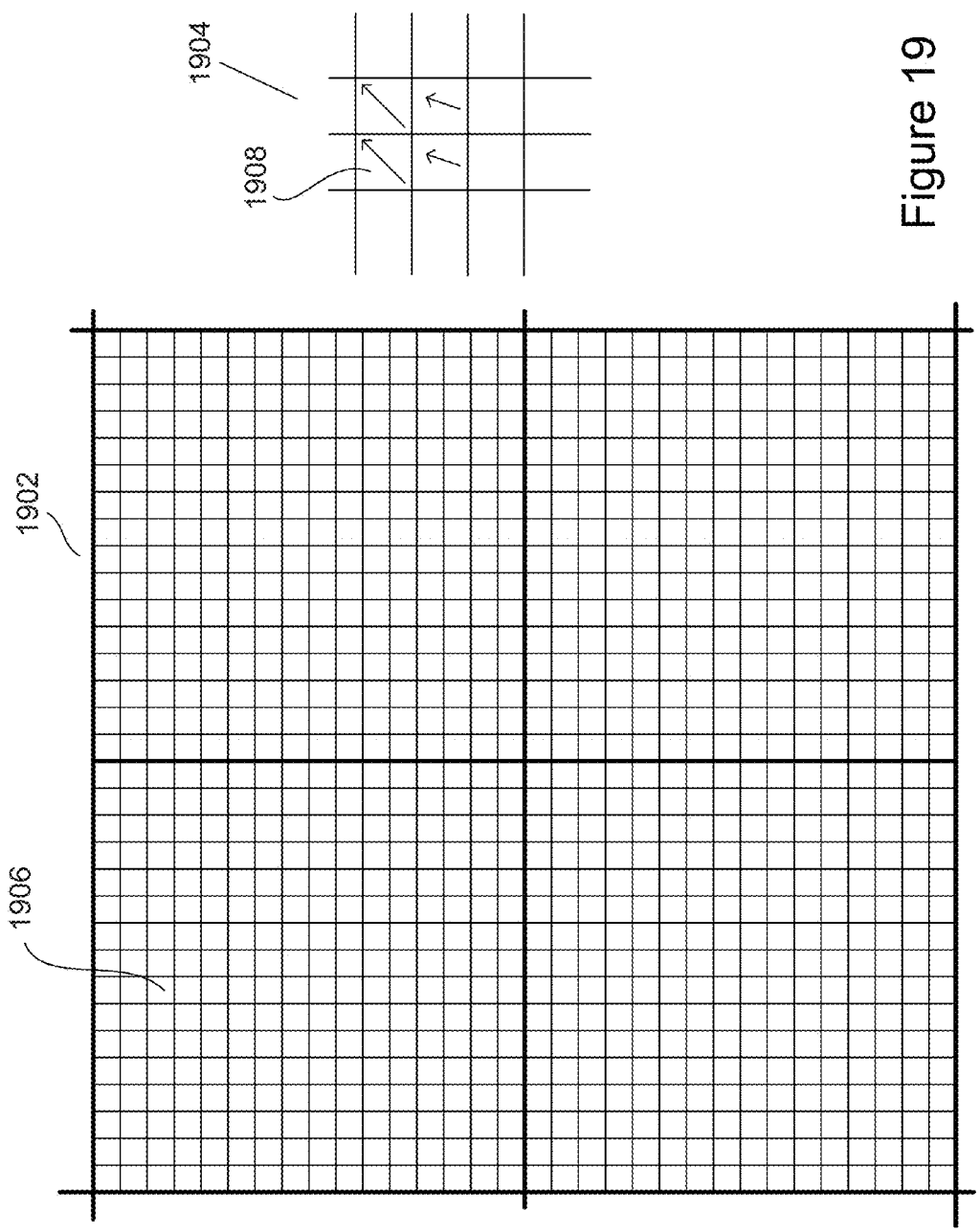
FIG. 19 illustrates the motion vectors that are extracted from an encoded and compressed video signal along with video frames by a video-processing system.

FIG. 19 illustrates the motion vectors that are extracted from an encoded and compressed video signal along with video frames by a video-processing system. As discussed in the first subsection, above, video encoding uses motion vectors to describe motion of macroblocks from frame to frame, so that motion vectors, rather than the macroblocks, may be transmitted in order to significantly increase the compression ratio for compressed and encoded video signals. Considering a decompressed and decoded video frame to be a two-dimensional matrix of macroblocks, a small four-macroblock portion of which is shown in FIG. 19 1902, the decompression and decoding process additionally produces a two-dimensional table of motion vectors for each macroblock, a portion of which 1904, corresponding to the portion of the two-dimensional array of macroblocks, is shown in FIG. 19. Thus, for each macroblock, such as macroblock 1906, there is a corresponding motion vector, such as motion vector 1908, in an accompanying table of motion vectors. As discussed in the first subsection, a motion vector may not always be found for a macroblock, in the case of discontinuities in the video sequence, in which case a 0-length motion vector can be assumed. Motion vectors are encoded in various different ways. For example, a motion vector can be encoded as having one of eight or 16 different directions, using three or four bits, respectively, along with a length encoded in sufficient additional bits to describe the greatest possible translational distance of a macroblock between successive frames. Alternative, the horizontal and vertical displacements of a macroblock can be encoded together as a motion vector.

Figure 20:
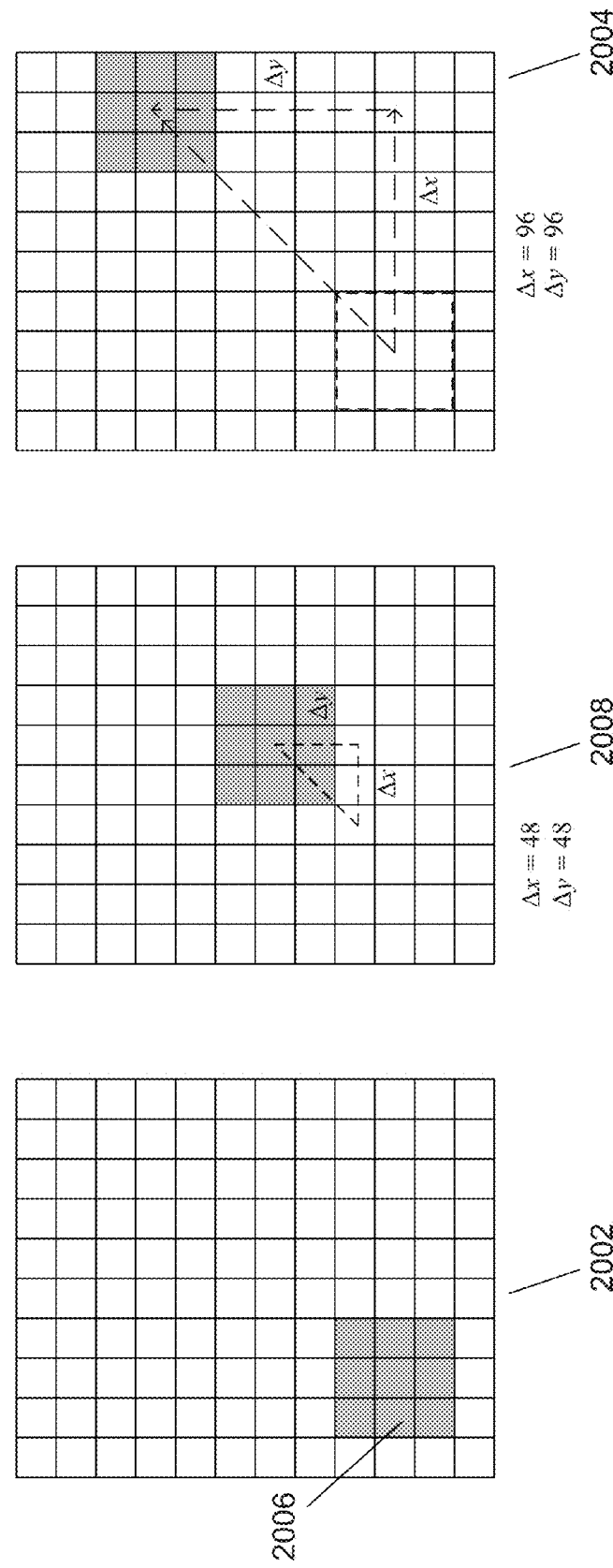
FIG. 20 illustrates a frame-interpolation method that uses a table of motion vectors.

FIG. 20 illustrates a frame-interpolation method that uses a table of motion vectors. FIG. 20 shows a small portion of video frame n 2002 and video frame n+1 2004 in which a small object 2006 moves from a lower left-hand region of the image portion to an upper, right-hand region of the image portion. Note that the portions of frames have gridlines corresponding to macroblocks, rather than pixels. In order to produce an interpolated frame 2008 from frame n portion 2002 and frame n+1 portion 2004, it is sufficient to have frame portion 2002 along with the motion-vector table prepared for frame portion n+1 2004. In particular, the motion-vector table contains the backward-pointing motion vectors, i.e., the motion vectors that describe the motion of macroblocks between frame portions 2002 and 2004. Motion of the macroblocks of the moving object in the interval between frame 2002 and frame 2004 is described by motion vectors that specify a positive horizontal translation of 96 pixels and a positive vertical translation of 96 pixels. Therefore, the interpolated, frame 2008 can be generated by modifying the motion vectors in the motion-vector table by essentially dividing the lengths of the motion-vectors by two. Thus, the interpolated frame can be generated by copying the frame portion of the preceding frame into a buffer while applying translations to the macroblocks according to modified motion vectors in an accompanying motion-vector table. As with any interpolation method, a motion-vector-based frame interpolation method is not perfect. However, for the majority of macroblocks in an image, a reasonable interpolation can be made, significantly ameliorating the perceived discontinuities in motion resulting from sample-and-hold display devices.

FIGS. 21A-D illustrate operation of a video-display device incorporating method and system embodiments of the present invention. The video-processing system 2102 includes, in addition to video-frame buffers 1 (2104) and 2 (2106), two motion-vector-table buffers 2108 and 2110. The timing-controller system 2112 includes two additional video-frame buffers 2114 and 2116 to hold interpolated frames, and includes an additional processing component 2118 that carries out motion-vector-table-based video-frame interpolation, as discussed above with reference to FIG. 20. The additional processing component may be implemented in firmware, software, or logic circuitry, or a combination of two or more of firmware, software, and logic circuits. An enhanced communications medium 2120 interconnects the video-processing system 2102 with the timing-controller system 2112. For example, one or more additional pairs of ENDS signal lines may be added to the set of LVDS signal-line pairs of the communications medium 1312 in FIG. 13A. However, unlike in the device illustrated in FIG. 18, the communications medium does not need to provide double the bandwidth of the communications medium shown in FIG. 13A, because motion-vector tables are much smaller than video frames, generally between ⅙ and ⅓ the size of video-frames, and therefore do not require a doubling of the bandwidth of the communications medium. Thus, using motion-vector-based video-frame interpolation, according to methods of the present invention, the video-display device incorporating method and system embodiments of the present invention is able to double the frame display rate using motion-vector-based flame interpolation with only modest increase in the complexity and cost of the video-display device.

Figure 21A:
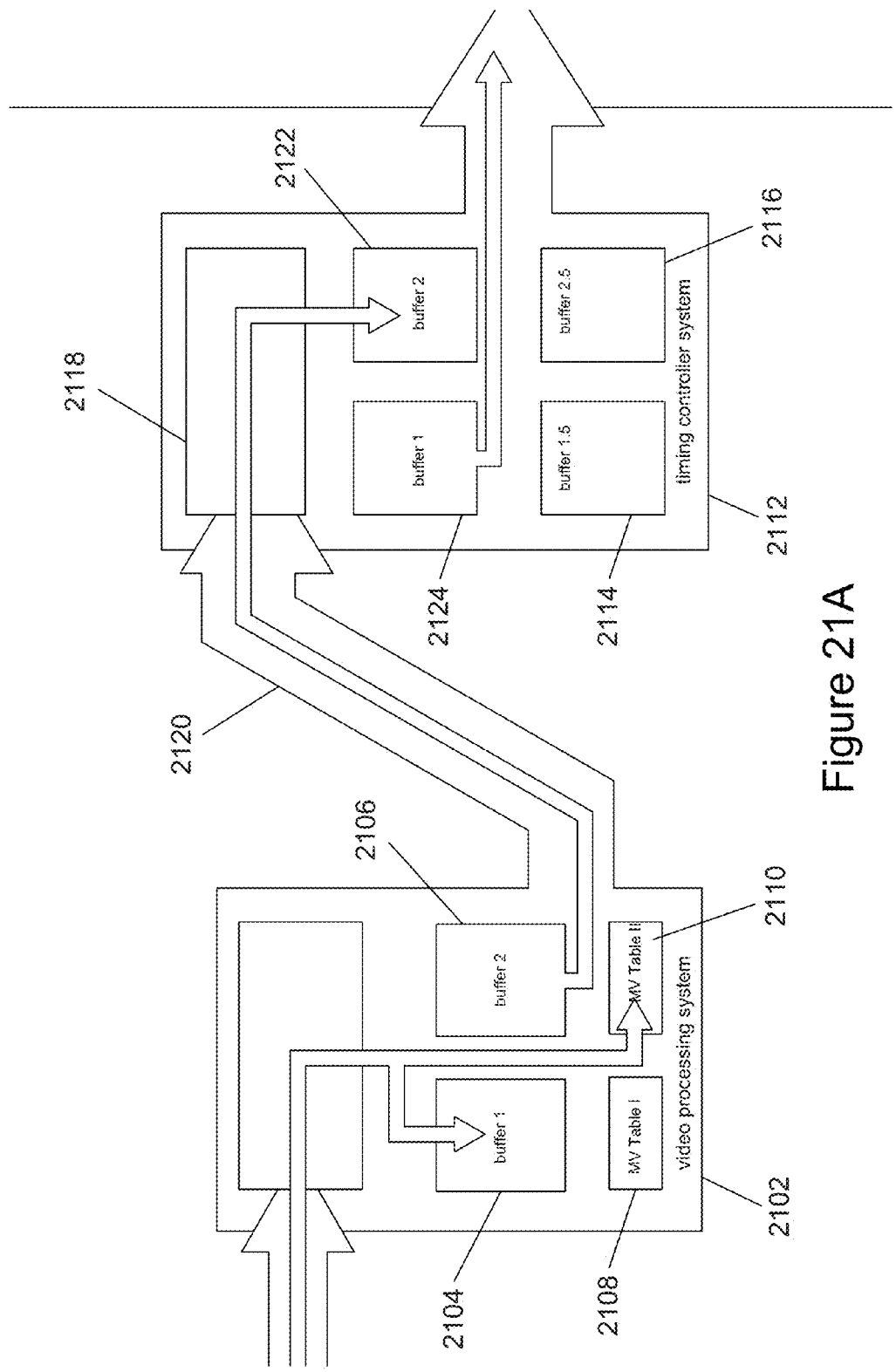
FIGS. 21A-D illustrate operation of a video-display device incorporating method and system embodiments of the present invention.

In FIG. 21A, the video-processing system is decompressing and decoding and a frame and storing the decompressed and decoded frame in video-frame buffer 1 (2104) while storing backward motion vectors obtained during the decompression and decoding process and modified for frame interpolation, as discussed above, into the motion-vector-table buffer 2 (2110). The already-constructed video frame in video-frame buffer 2 (2106) within the video-processing system is being transmitted to video-frame-buffer 2 (2122) in the timing-controller system, and the already-received video frame stored in video-frame buffer 1 (2124) of the timing-controller system is being displayed on the LCD panel.

Figure 21B:
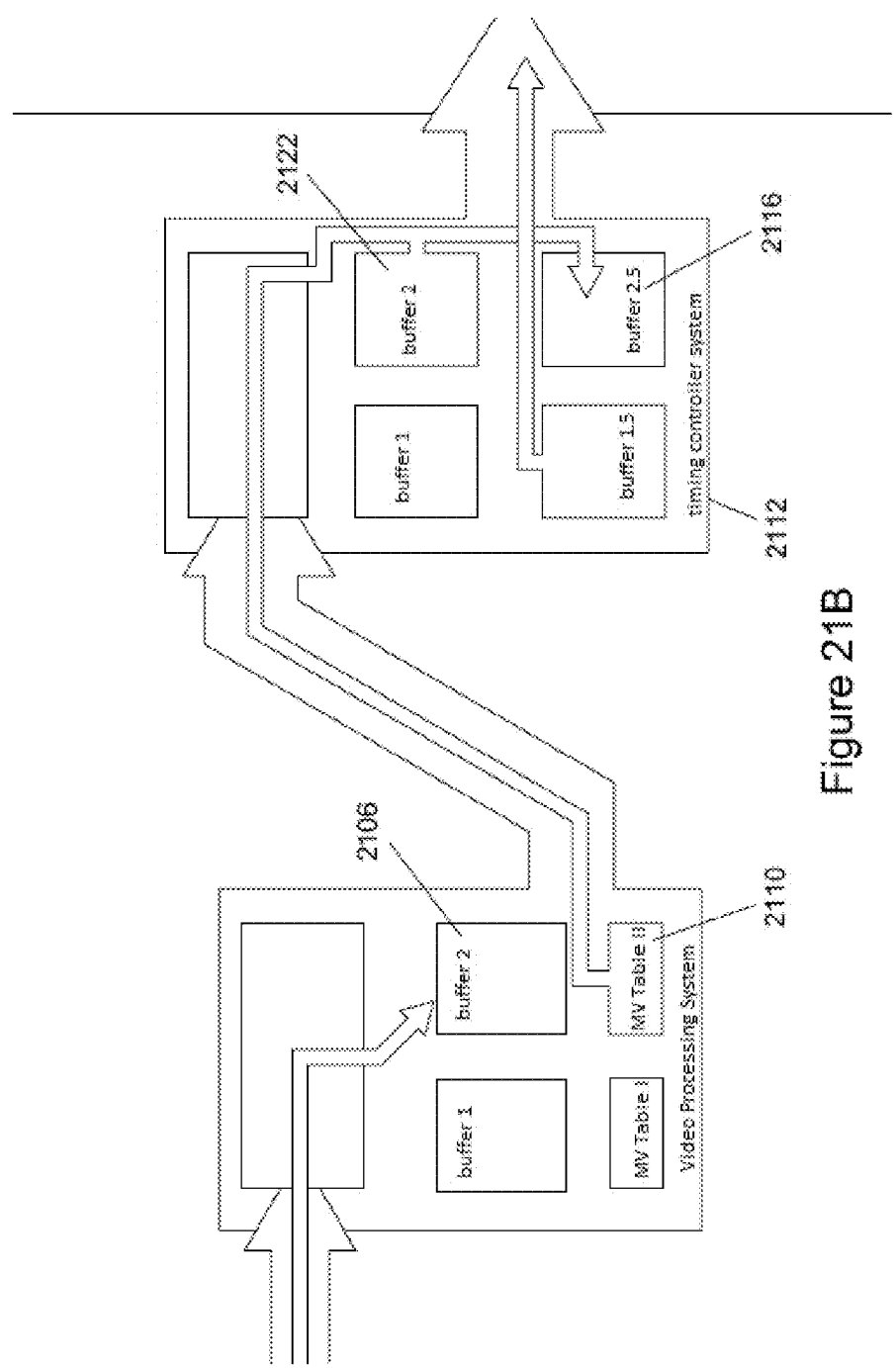

In FIG. 21B, the contents of the motion-vector table 2 (2110) of the video-processing system are being transmitted to the timing-controller system 2112 while a next frame has begun to be decompressed and decoded and stored into video-frame buffer 2 (2106) of the video-processing system. The timing-controller system uses the motion vectors of motion vector table 2 and already-received, video frame in video-frame buffer 2 (2122) to generate an interpolated frame that is stored video-frame buffer 2.5 (2116).

Figure 21C:
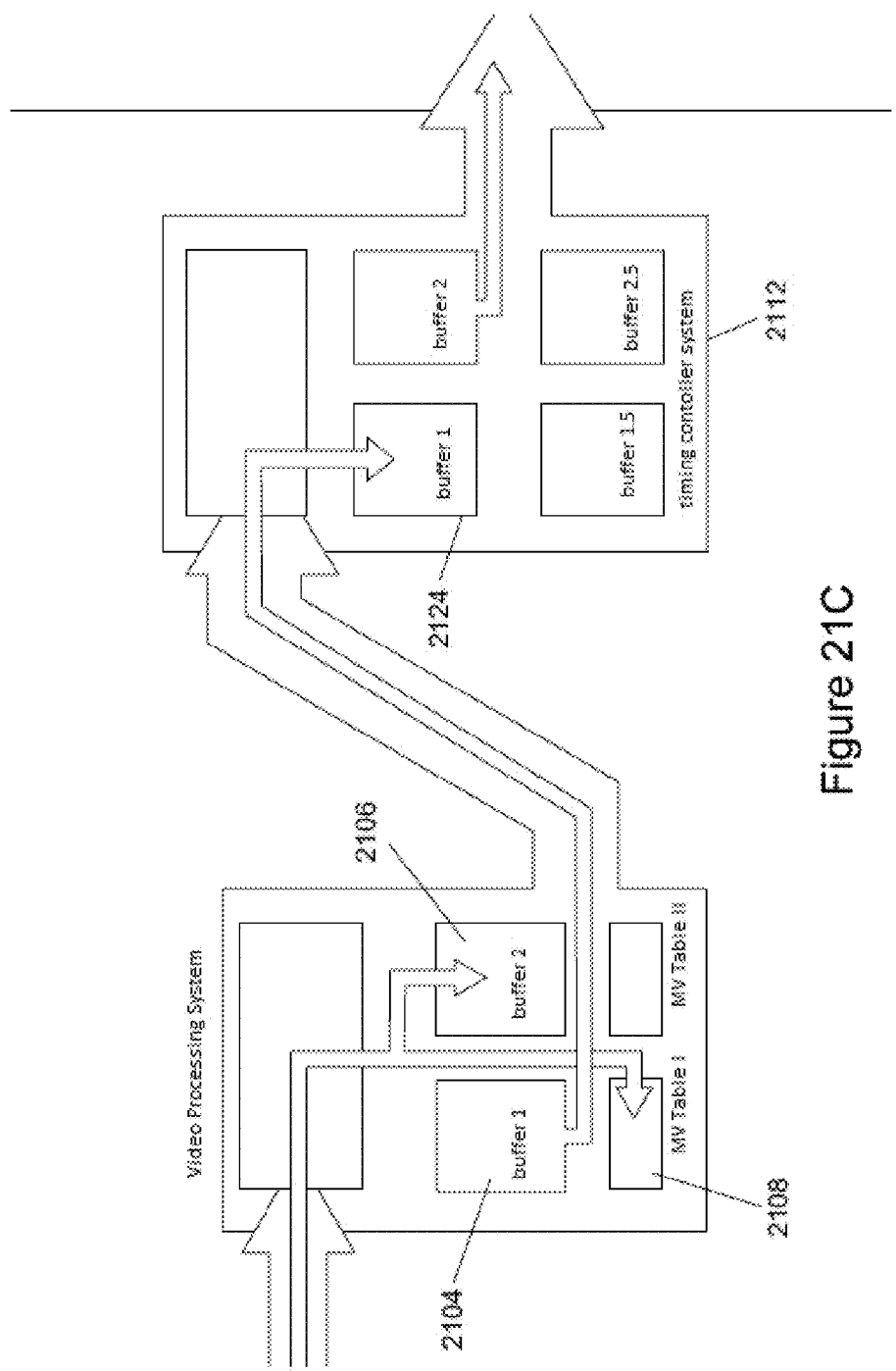

In FIG. 21C, the frame that was begun to be decompressed and decoded, in FIG. 21B, continues to be decompressed and decoded and stored in video-frame buffer 2 2106, with motion vectors extracted during this process and modified for frame interpolation are stored in motion-vector-table buffer 1 2108. The already-constructed video frame stored in video-frame buffer 1 (2104) is being transmitted to video-frame-buffer 1 (2124) in the timing-controller system 2112.

Figure 21D:
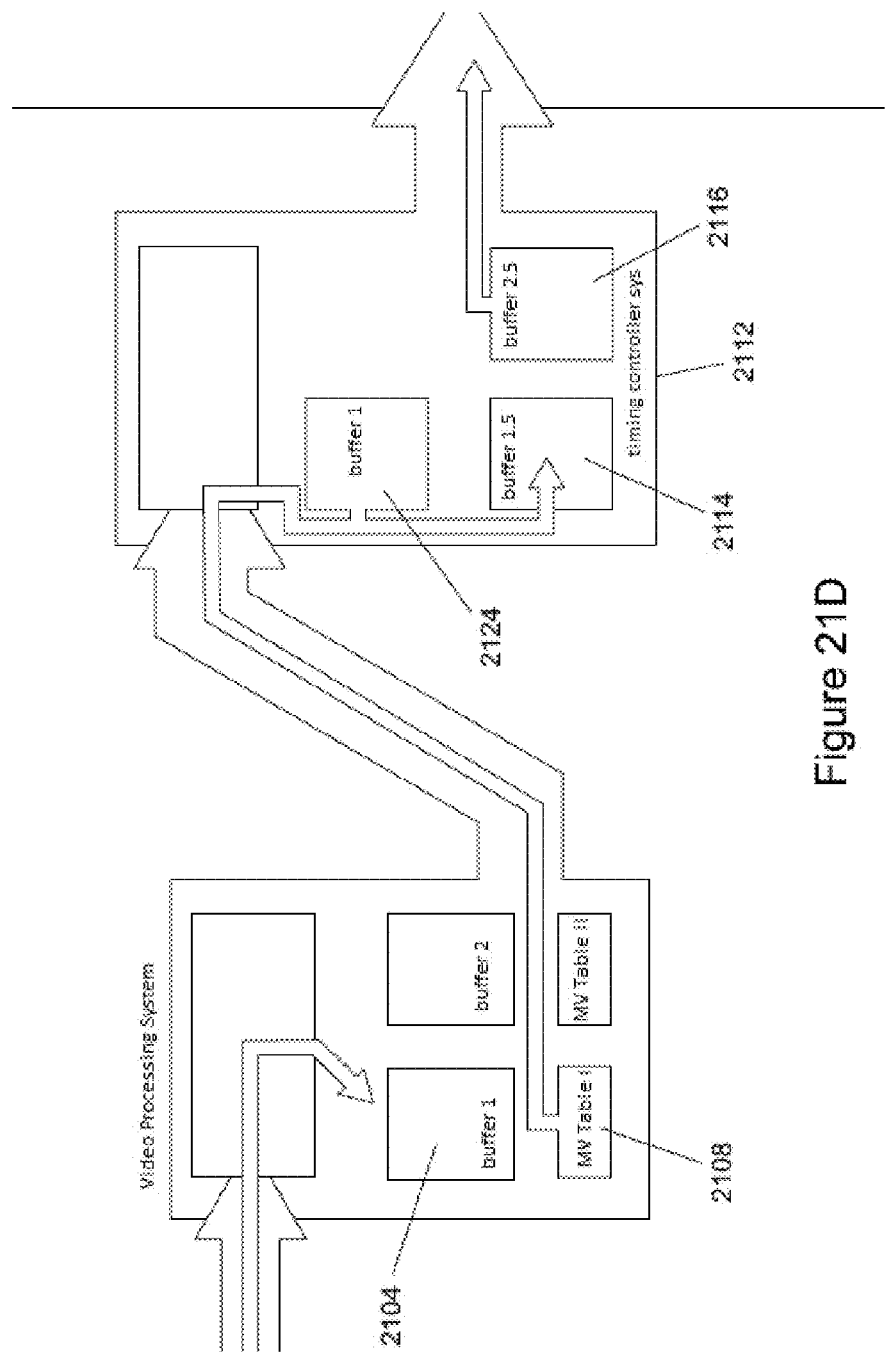

In FIG. 21D, a next frame has begun to be decompressed and decoded and stored into video-frame buffer 1 (2104) while the motion vectors in the motion-vector-table buffer 1 2108 are transmitted to the timing-controller system 2112. The timing-controller system uses these motion vectors along with the already-received video frame stored in video-frame buffer 1 (2124), to generate an interpolated frame that is stored in video-frame buffer 1.5 (2114), while the already-constructed interpolated frame stored in video-frame buffer 2.5 (2116) is displayed to the LCD panel. The sequence of operations illustrated in FIGS. 21A-D thus proceeds in a continuous fashion to decode and decompress video frames in the input video signal, extract, modify, and store motion vectors in motion-vector tables, transmit the decompressed and decoded video frames and modified motion-vector tables to the timing-controller system, generate interpolated frames by the timing-controller system, and display both the decompressed and decoded video frames from the input video signal as well as the interpolated frames in interleaved fashion at twice the nominal frame-display rate. In this fashion, for example, a 60 Hz LCD television can be enhanced to a produce a 120 Hz LCD television. In alternative embodiments, additional interpolated frames can be inserted between decompressed and decoded frames to farther increase the frame-display rate.

In the first subsection, various different types of frames included in encoded and compressed video signal are discussed, including B, and P frames. Encoded I frames are not accompanied with motion vectors, P frames include backward motion vectors, and B frames include both backward and forward motion vectors. An added complexity to video-frame interpolation based on motion vectors in certain embodiments of the present invention is that, for the frame proceeding an I frame, forward motion vectors are extracted for the motion-vector table that accompanies the I frame, while for all other frames, backward motion vectors from subsequent frames are used to compare the motion-vector tables that accompany the preceding frames. Alternative methods for overcoming the lack of motion vectors in encoded I frames can be employed, including interpolating a frame between a first frame and a second I frame by an averaging method or some other computational method that does not use motion vectors.

Figure 22:
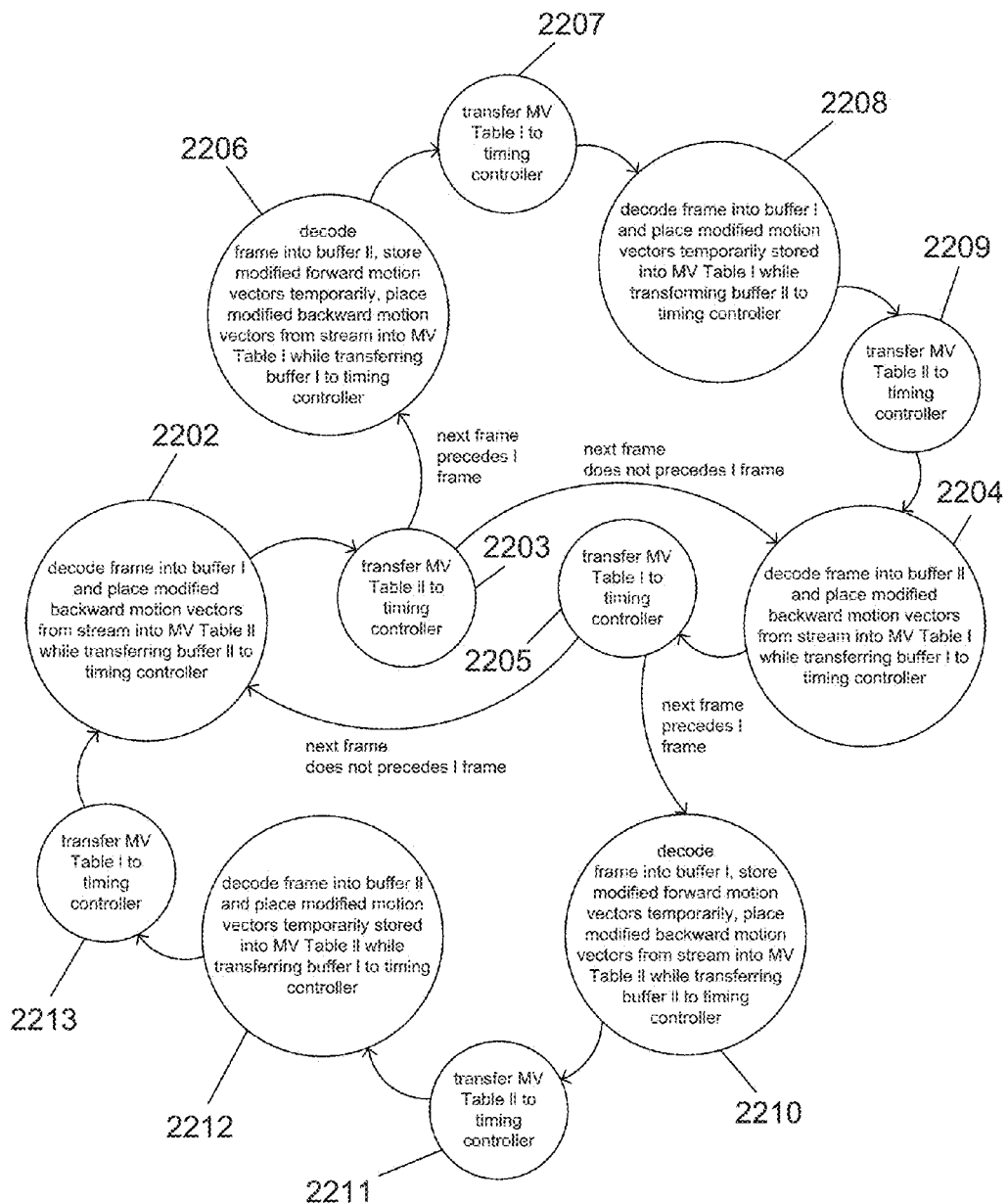
FIG. 22 provides a state-transition diagram for the video-processing system of a video-display device that incorporates method and system embodiments of the present invention.

FIG. 22 provides a state-transition diagram for the video-processing system of a video-display device that incorporates method and system embodiments of the present invention. A video-processing system generally transitions through a cycle comprising states 2202-2205. State 2202 corresponds to the state depicted in FIG. 21A, state 2203 corresponds to the state depicted in FIG. 21B, state 2204 corresponds to the state depicted in FIG. 21C, and state 2205 corresponds to the state depicted in FIG. 21*a*. However, when the next frame to be decoded precedes an I frame, then the sequence of states 2206-2209 or the sequence of states 2210-2213 is carried out to extract and modify both backward and forward motion vectors, in states 2206 and 2210, so that a motion vector table can be prepared for an I frame in states 2208 and 2212. In alternative embodiments, an interpolation method for I frames not involving motion vectors may alternatively be employed or, in certain embodiments, rather than interpolating a frame between a frame preceding an I frame and a following I frame, the frame preceding the I frame can simply be repeated, without interpolation, with little cost in degradation or blurring of the resulting displayed video image.

Figure 23:
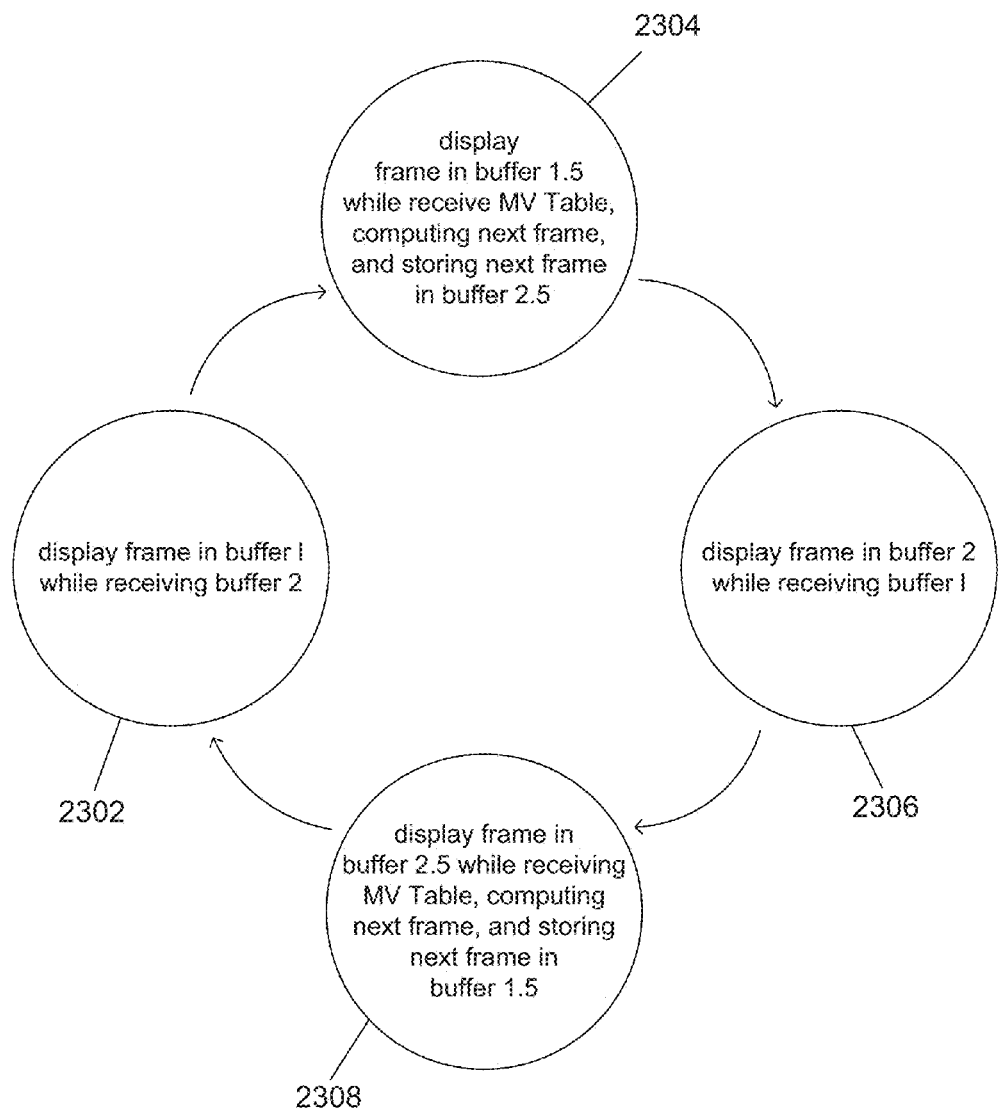
FIG. 23 provides a state-transition diagram for the timing-controller system of a video-display device that incorporates method and system embodiments of the present invention.

FIG. 23 provides a state-transition diagram for the timing-controller system of a video-display device that incorporates method and system embodiments of the present invention. State 2302 corresponds to the state shown in FIG. 21A, state 2304 corresponds to the state shown in FIG. 21B, state 2306 corresponds to the state displayed in FIG. 21C, and state 2308 corresponds to the state shown in FIG. 21D.

Although the present invention has been described in terms of particular embodiments, it is not intended that the invention be limited to these embodiments. Modifications within the spirit of the invention will be apparent to those skilled in the art. For example, method and system embodiments of the present invention may be incorporated in a variety of different types of video-display devices, including televisions, computer monitors, and other types of video-display systems. Motion-vector-based frame interpolation may be carried out using a variety of different interpolation methods, including the simple method of dividing the lengths of the motion vectors by two, while maintaining the motion vector directions, discussed with reference to FIG. 20, or by other more computationally intense methods. A wide variety of different software, firmware, logic circuit, or combination implementations of the logic for motion-vector extraction, modification, and buffering as well as video-frame interpolation based on motion-vector tables are possible, by varying any of various design parameters, including modular organization, control structures, data structures, control flow, and other such design parameters. In alternative embodiments, the frame-display rate may be further increased by increasing the number of interpolated frames included in the output video stream between original frames received in the input video signal.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A video display device comprising:
   a display;
   a communications medium;
   a video processing system including a first and a second video frame buffer and a first and a second motion vector table buffer, the video processing system to:
      receive a compressed and encoded video signal comprising individual video frames;
      decompress and decode the individual video frames to produce output video frames, a number of the output video frames having associated motion vector tables; and
      buffer the output video frames in the first and the second video frame buffers, and the associated motion vector tables in the first and the second motion vector table buffers; and
   a timing controller system to:
      receive the output video frames and the associated motion vector tables from the video processing system over the communications medium;
      generate interpolated video frames from the received output video frames and the associated motion vector tables;
      interleave the interpolated video frames between the received output video frames; and
      transmit an interleaved video stream to the display, the interleaved video stream comprising the interpolated video frames between the received output video frames.

2. The video display device of claim 1, wherein the timing controller system is to generate the interpolated video frames only for the number of the output video frames having associated motion vector tables, and wherein the interleaved video stream increases a frame display rate by a factor corresponding to the number of the output video frames having associated motion vector tables.

3. The video display device of claim 1,
   wherein the video processing system is further to:
   during a first sequence, send a first output video frame and a first motion vector table from the first video frame buffer and the first motion vector table buffer to the timing controller system while buffering a second output video frame and a second motion vector table in the second video frame buffer and the second motion vector table buffer; and
   during a second sequence, send the second output video frame and the second motion vector table to the timing controller system while buffering a third output video frame and a third motion vector table in the first video frame buffer and the first motion vector table buffer;
   wherein the first and the second sequence are repeated continuously for a duration corresponding to the compressed and encoded video signal.

4. The video display device of claim 1,
   wherein the timing controller system includes a first, a second, a third, and a fourth buffer, and wherein the timing controller system is further to:
   during a first sequence, buffer a first output video frame in the first buffer while providing a second output video frame, stored in the second buffer, to the display;
   during a second sequence, generate a first interpolated video frame and buffer the first interpolated frame in the third buffer while providing a second interpolated video frame, stored in the fourth buffer, to the display;
   during a third sequence, buffer a third output video frame in the second buffer while providing the first output video frame, stored in the first buffer, to the display; and
   during a fourth sequence, generate a third interpolated video frame and buffer the third interpolated video frame in the fourth buffer while providing the first interpolated video frame, stored in the third buffer, to the display;

wherein the first, the second, the third, and the fourth sequences are repeated continuously for a duration corresponding to the compressed and encoded video signal.

5. The video display device of claim 1, wherein the video processing system modifies each associated motion vector table prior to buffering the output video frames and the associated motion vector tables.

6. The video display device of claim 5, wherein the video processing system modifies each of the associated motion vector tables by halving motion vectors of the associated motion vector table to enable the timing controller to generate the interpolated video frames based on the halved motion vectors.

7. The video display device of claim 1, wherein the timing controller system generates the interpolated video frames by displacing respective macroblocks within the output video frames according to a motion vector, of the associated motion vector table, corresponding to the respective macroblock.

8. A method for increasing a frame display rate of a video display device, the method comprising:
using a video processing system included in the video display device:
receiving a compressed and encoded video signal comprising individual video frames;
decompressing and decoding the individual video frames to produce output video frames, a number of the output video frames having associated motion vector tables;
buffering the output video frames and the associated motion vector tables in memory buffers; and
transmitting the output video frames and the associated motion vector tables to a timing controller system included in the video display device, the timing controller system including a first, a second, a third, and a fourth video frame buffer;
using the timing controller system:
receiving the output video frames and the associated motion vector tables;
buffering the received output video frames in the first and the second video frame buffers;
generating interpolated video frames from the received output video frames and the associated motion vector tables;
buffering the interpolated video frames in the third and the fourth video frame buffers;
interleaving the interpolated video frames between the received output video frames; and
displaying, on a display of the video display device, an interleaved video stream comprising the interpolated video frames between the received output video frames.

9. The method of claim 8, wherein the timing controller system is to generate the interpolated video frames only for the number of the output video frames having associated vector tables, and wherein the interleaved video stream increases the frame display rate by a factor corresponding to the number of the output video frames having associated motion vector tables.

10. The method of claim 8, wherein the video processing system includes a first and a second video frame buffer and a first and a second motion vector table buffer, the first and the second motion vector table buffers each buffering a respective motion vector table associated with a respective one of the number of output video frames, the method further comprising:
using the video processing system:
during a first sequence, sending a first output video frame and a first motion vector table from the first video frame buffer and the first motion vector table buffer to the timing controller system while buffering a second output video frame and a second motion vector table in the second video frame buffer and the second motion vector table buffer; and
during a second sequence, sending the second output video frame and the second motion vector table to the timing controller system while buffering a third output video frame and a third motion vector table in the first video frame buffer and the first motion vector table buffer;
wherein the first and the second sequence are repeated continuously for a duration corresponding to the compressed and encoded video signal.

11. The method of claim 8, further comprising:
using the timing controller system:
during a first sequence, buffering a first output video frame in the first buffer while providing a second output video frame, stored in the second buffer, to the display;
during a second sequence, generating a first interpolated video frame and buffering the first interpolated video frame in the third buffer while providing a second interpolated video frame, stored in the fourth buffer, to the display;
during a third sequence, buffering a third output video frame in the second buffer while providing the first video frame, stored in the first buffer, to the display; and
during a fourth sequence, generating a third interpolated video frame and buffering the third interpolated video frame in the fourth buffer while providing the first interpolated video frame, stored in the third buffer, to the display;
wherein the first, the second, the third, and the fourth sequences are repeated continuously for a duration corresponding to the compressed and encoded video signal.

12. The method of claim 8, wherein the video processing system modifies the associated motion vector tables prior to buffering the output video frames and the associated motion vector tables.

13. The method of claim 12, wherein the video processing system modifies the associated motion vector table by halving motion vectors of the associated motion vector table to enable the timing controller to generate the interpolated frames based on the halved motion vectors.

14. The method of claim 8, wherein the timing controller system generates the interpolated video frames by displacing respective macroblocks within the output video frames according to a motion vector, of the associated motion vector table, corresponding to the respective macroblock.

* * * * *

UNITED STATES PATENT AND TRADEMARK OFFICE
CERTIFICATE OF CORRECTION

PATENT NO. : 9,185,339 B2  Page 1 of 1
APPLICATION NO. : 13/122150
DATED : November 10, 2015
INVENTOR(S) : Leonard Tsai It is certified that error appears in the above-identified patent and that said Letters Patent is hereby corrected as shown below:

Drawings

In sheet 6 of 31, Figure 7, line 2 approx., insert -- 702 --, therefor.

In sheet 6 of 31, Figure 7, line 4 approx., insert -- 704 --, therefor.

In sheet 7 of 31, Figure 8, below reference numeral 810, insert -- Macroblock --, therefor.

In sheet 7 of 31, Figure 8, delete "subsequent", insert -- subsequent frame --, therefor.

In sheet 7 of 31, Figure 8, below reference numeral 812, insert -- single frame --, therefor.

In sheet 7 of 31, Figure 8, delete "current", insert -- current frame --, therefor.

In sheet 7 of 31, Figure 8, above reference numeral 806, insert -- Macroblock --, therefor.

In sheet 7 of 31, Figure 8, delete "previous", insert -- previous frame --, therefor.

In sheet 7 of 31, Figure 8, above reference numeral 808, insert -- Macroblock --, therefor.

Signed and Sealed this
Seventh Day of June, 2016

Michelle K. Lee
*Director of the United States Patent and Trademark Office*